(12) United States Patent
Jiang et al.

(10) Patent No.: US 11,924,805 B2
(45) Date of Patent: Mar. 5, 2024

(54) POSITIONING METHOD AND DEVICE, ELECTRONIC DEVICE AND STORAGE MEDIUM

(71) Applicant: BEIJING QISHENG SCIENCE AND TECHNOLOGY CO., LTD., Beijing (CN)

(72) Inventors: Yanze Jiang, Beijing (CN); Yu Liu, Beijing (CN)

(73) Assignee: BEIJING QISHENG SCIENCE AND TECHNOLOGY CO., LTD., Beijing (CN)

( * ) Notice: Subject to any disclaimer, the term of this patent is extended or adjusted under 35 U.S.C. 154(b) by 346 days.

(21) Appl. No.: 17/454,066

(22) Filed: Nov. 9, 2021

(65) Prior Publication Data
US 2022/0070821 A1    Mar. 3, 2022

Related U.S. Application Data

(63) Continuation of application No. PCT/CN2020/093482, filed on May 29, 2020.

(30) Foreign Application Priority Data

May 29, 2019  (CN) .......................... 201910458371.7

(51) Int. Cl.
*H04W 64/00*    (2009.01)
*G01S 5/02*    (2010.01)
(Continued)

(52) U.S. Cl.
CPC ......... *H04W 64/006* (2013.01); *G01S 5/0258* (2020.05); *G01S 5/0284* (2013.01);
(Continued)

(58) Field of Classification Search
CPC .. H04W 64/006; G01S 5/0258; G01S 5/0284; G01S 5/14; G08G 1/0141; G08G 1/149
See application file for complete search history.

(56) References Cited

U.S. PATENT DOCUMENTS 9,584,973 B2    2/2017  Park
10,660,062 B1 *  5/2020  Yin ...................... G01C 21/206
(Continued)

FOREIGN PATENT DOCUMENTS

CA         2975721 A1    2/2019
CN       104333903 A    2/2015
(Continued)

OTHER PUBLICATIONS

International Search Report in PCT/CN2020/093482 dated Aug. 28, 2020, 7 pages.
(Continued)

*Primary Examiner* — Moustapha Diaby
(74) *Attorney, Agent, or Firm* — METIS IP LLC

(57) ABSTRACT

The present disclosure provides a positioning method and device, an electronic device, and a storage medium. The positioning method may include obtaining a precise positioning request sent by a service equipment. The precise positioning request may carry rough positioning location information of the service equipment. The positioning method may further include determining, based on the rough positioning location information of the service equipment, a reference positioning point corresponding to the service equipment, and obtaining precise positioning location information of the service equipment by correcting, based on positioning deviation information of the reference positioning point, the rough positioning location information of the service equipment. The positioning deviation information of the reference positioning point may be calculated based on precise positioning location information of the reference
(Continued)

Obtaining a precise positioning request sent by a service equipment, the precise positioning request carrying rough positioning location information of the service equipment — S301

Determining, based on the rough positioning location information of the service equipment, a reference positioning point corresponding to the service equipment — S302

Obtaining precise positioning location information of the service equipment by correcting, based on positioning deviation information of the reference positioning point — S303 positioning point and rough positioning location information of the reference positioning point.

20 Claims, 7 Drawing Sheets

(51) Int. Cl.
*G01S 5/14* (2006.01)
*G08G 1/01* (2006.01)
*G08G 1/14* (2006.01)
*H04W 4/02* (2018.01)

(52) U.S. Cl.
CPC .............. *G01S 5/14* (2013.01); *G08G 1/0141* (2013.01); *G08G 1/149* (2013.01)

(56) References Cited

U.S. PATENT DOCUMENTS

| | | | |
|---|---|---|---|
| 2009/0267831 A1* | 10/2009 | Son | G01S 19/05 342/357.64 |
| 2014/0115895 A1 | 5/2014 | Herzinger et al. | |
| 2018/0020421 A1 | 1/2018 | Kumar et al. | |
| 2018/0108103 A1 | 4/2018 | Li et al. | |
| 2018/0302740 A1 | 10/2018 | Tseng et al. | |
| 2018/0367603 A1 | 12/2018 | Tao et al. | |
| 2021/0180981 A1* | 6/2021 | Matsumoto | G01C 21/3815 |

FOREIGN PATENT DOCUMENTS

| | | |
|---|---|---|
| CN | 104869637 A | 8/2015 |
| CN | 105578420 A | 5/2016 |
| CN | 105898692 A | 8/2016 |
| CN | 106231561 A | 12/2016 |
| CN | 106358155 A | 1/2017 |
| CN | 106998535 A | 8/2017 |
| CN | 107071743 A | 8/2017 |
| CN | 107700970 A | 2/2018 |
| CN | 107949052 A | 4/2018 |
| CN | 108235255 A | 6/2018 |
| CN | 108259674 A | 7/2018 |
| CN | 108810802 A | 11/2018 |
| CN | 109618280 A | 4/2019 |
| CN | 109660947 A | 4/2019 |
| CN | 208782813 U | 4/2019 |
| CN | 208783112 U | 4/2019 |

OTHER PUBLICATIONS

Written Opinion in PCT/CN2020/093482 dated Aug. 28, 2020, 8 pages.
First Office Action in Chinese Application No. 201910458371.7 dated Nov. 2, 2021, 22 pages.

* cited by examiner (a)

(b)

POSITIONING METHOD AND DEVICE, ELECTRONIC DEVICE AND STORAGE MEDIUM

CROSS-REFERENCE TO RELATED APPLICATIONS

This application is a continuation of International Application No. PCT/CN2020/093482, filed on May 29, 2020, which claims priority of Chinese application No. 201910458371.7, filed on May 29, 2019, the entire contents of each of which are hereby incorporated by reference.

TECHNICAL FIELD

The present disclosure relates to the technical field of positioning, and in particular, to a positioning method and device, an electronic device, and a storage medium.

BACKGROUND

With the development of society and economy, various transportation tools (e.g., shared vehicles, delivery vehicles, tour buses, etc.) or mobile devices (e.g., mobile phones and wearable devices) are positioned to facilitate people to search for or monitor the transportation tools or the mobile devices. For example, in some application scenarios that need to know location information of a shared vehicle, it is sufficient to provide the rough positioning location information of the shared vehicle. That is, a positioning accuracy required in the application scenarios is low. However, in other application scenarios such as standardized positioning parking or operation and maintenance personnel accurately searching for shared vehicles, it is necessary to know the precise location information of the shared vehicles, so as to facilitate standardized parking and searching for hidden shared vehicles. Therefore, it is desirable to provide a method for obtaining the precise positioning location information of the service equipment.

SUMMARY

In view of this, the present disclosure aims to provide a positioning method and device, electronic device, and storage medium to provide a precise positioning method.

According to one aspect of the present disclosure, a positioning method is provided. The positioning method may be applied to a backend server and include obtaining a precise positioning request sent by a service equipment. The precise positioning request may carry rough positioning location information of the service equipment. The positioning method may further include determining, based on the rough positioning location information of the service equipment, a reference positioning point corresponding to the service equipment, and obtaining precise positioning location information of the service equipment by correcting, based on positioning deviation information of the reference positioning point, the rough positioning location information of the service equipment. The positioning deviation information of the reference positioning point may be calculated based on precise positioning location information of the reference positioning point and rough positioning location information of the reference positioning point.

In some embodiments, the determining, based on the rough positioning location information of the service equipment, a reference positioning point corresponding to the service equipment may include calculating, based on the rough positioning location information of the service equipment, a distance between the service equipment and each positioning point, and selecting a positioning point with the shortest distance from the service equipment as the reference positioning point.

In some embodiments, the determining, based on the rough positioning location information of the service equipment, a reference positioning point corresponding to the service equipment may include determining, based on the rough positioning location information of the service equipment and preset positioning region information, a positioning region where the service equipment is located, and determining a positioning point in the positioning region where the service equipment is located as the reference positioning point.

In some embodiments, edges of two adjacent positioning regions may be close to each other, and/or edges of two adjacent positioning regions may overlap with each other.

In some embodiments, if there are a plurality of reference positioning points, the obtaining precise positioning location information of the service equipment by correcting, based on positioning deviation information of the reference positioning point, the rough positioning location information of the service equipment may include determining a weighting coefficient based on a distance between the service equipment and each reference positioning point, determining comprehensive deviation information by weighting, based on the weighting coefficient, the positioning deviation information of each reference positioning point, and obtaining the precise positioning location information of the service equipment by correcting, based on the comprehensive deviation information, the rough positioning location information of the service equipment.

In some embodiments, the precise positioning request may further carry an identification code of the service equipment. The service equipment may be a vehicle. And after obtaining the precise positioning location information of the service equipment, the positioning method may further include when receiving information indicating that the vehicle has been locked sent by the service equipment, determining, based on the precise positioning location information of the service equipment and pre-stored legitimate parking region information, whether the vehicle is located in a legitimate parking region, and in response to determining that the vehicle is not located in the legitimate parking region, controlling the service equipment to perform an unlocking operation, and sending information indicating that the vehicle cannot be locked to a user terminal associated with the identification code.

In some embodiments, the service equipment may be a vehicle, and after obtaining the precise positioning location information of the service equipment, the positioning method may further include when receiving a locking request sent by a user terminal, determining, based on the precise positioning location information of the service equipment and pre-stored legitimate parking region information, whether the vehicle is located in a legitimate parking region, and in response to determining that the vehicle is not located in the legitimate parking region, sending information indicating that the vehicle cannot be locked to the user terminal.

According to an aspect of the present disclosure, a positioning method is provided. The positioning method may be applied to a service equipment and include sending a precise positioning request to a backend server. The precise positioning request may carry rough positioning location information of the service equipment. The positioning method may further include receiving a reference positioning point corresponding to the service equipment returned by the backend server. The reference positioning point may be determined by the backend server based on the rough positioning location information of the service equipment. And the positioning method may further include obtaining precise positioning location information of the service equipment by correcting, based on positioning deviation information of the reference positioning point, the rough positioning location information of the service equipment. The positioning deviation information of the reference positioning point may be calculated based on precise positioning location information of the reference positioning point and rough positioning location information of the reference positioning point.

In some embodiments, if there are a plurality of reference positioning points, the obtaining precise positioning location information of the service equipment by correcting, based on positioning deviation information of the reference positioning point, the rough positioning location information of the service equipment may include determining a weighting coefficient based on a distance between the service equipment and each reference positioning point, determining comprehensive deviation information by weighting, based on the weighting coefficient, positioning deviation information of each reference positioning point, and obtaining the precise positioning location information of the service equipment by correcting, based on the comprehensive deviation information, the rough positioning location information of the service equipment.

According to another aspect of the present disclosure, a positioning device residing in a backend server is provided. The positioning device may include an obtaining module, a determination module, and a processing module. The obtaining module may be configured to obtain a precise positioning request sent by a service equipment. The precise positioning request may carry rough positioning location information of the service equipment. The determination module may be configured to determine, based on the rough positioning location information of the service equipment, a reference positioning point corresponding to the service equipment. And the processing module may be configured to obtain precise positioning location information of the service equipment by correcting, based on positioning deviation information of the reference positioning point, the rough positioning location information of the service equipment. The positioning deviation information of the reference positioning point may be calculated based on precise positioning location information of the reference positioning point and rough positioning location information of the reference positioning point.

In some embodiments, the determination module may be further configured to calculate, based on the rough positioning location information of the service equipment, a distance between the service equipment and each positioning point, and select a positioning point with the shortest distance from the service equipment as the reference positioning point.

In some embodiments, the determination module may be further configured to determine, based on the rough positioning location information of the service equipment and preset positioning region information, a positioning region where the service equipment is located, and determine a positioning point in the positioning region where the service equipment is located as the reference positioning point.

In some embodiments, edges of two adjacent positioning regions may be close to each other, and/or edges of two adjacent positioning regions may overlap with each other.

In some embodiments, if there are a plurality of reference positioning points, the processing module may be further configured to determine a weighting coefficient based on a distance between the service equipment and each reference positioning point, determine comprehensive deviation information by weighting, based on the weighting coefficient, the positioning deviation information of each reference positioning point, and obtain the precise positioning location information of the service equipment by correcting, based on the comprehensive deviation information, the rough positioning location information of the service equipment.

In some embodiments, the precise positioning request may further carry an identification code of the service equipment. The service equipment may be a vehicle. And the positioning device may further include a control module configured to, after the processing module obtains the precise positioning location information of the service equipment, when receiving information indicating that the vehicle has been locked sent by the service equipment, determine, based on the precise positioning location information of the service equipment and pre-stored legitimate parking region information, whether the vehicle is located in a legitimate parking region, and in response to determining that the vehicle is not located in the legitimate parking region, control the service equipment to perform an unlocking operation, and send information indicating that the vehicle cannot be locked to a user terminal associated with the identification code.

In some embodiments, the service equipment may be a vehicle, and the positioning device may further include a control module configured to, after the processing module obtains the precise positioning location information of the service equipment, when receiving a locking request sent by a user terminal, determine, based on the precise positioning location information of the service equipment and pre-stored legitimate parking region information, whether the vehicle is located in a legitimate parking region, and in response to determining that the vehicle is not located in the legitimate parking region, send information indicating that the vehicle cannot be locked to the user terminal.

According to a further aspect of the present disclosure, a positioning device residing in a backend server is provided. The positioning device may include a sending module, a receiving module, and a processing module. The sending module may be configured to send a precise positioning request to a backend server. The precise positioning request may carry rough positioning location information of the service equipment. The receiving module may be configured to receive a reference positioning point corresponding to the service equipment returned by the backend server. The reference positioning point may be determined by the backend server based on the rough positioning location information of the service equipment. And the processing module may be configured to obtain precise positioning location information of the service equipment by correcting, based on positioning deviation information of the reference positioning point, the rough positioning location information of the service equipment. The positioning deviation information of the reference positioning point may be calculated based on precise positioning location information of the reference positioning point and rough positioning location information of the reference positioning point.

In some embodiments, if there are a plurality of reference positioning points, the processing module may be further configured to determine a weighting coefficient based on a distance between the service equipment and each reference positioning point, determine comprehensive deviation information by weighting, based on the weighting coefficient, positioning deviation information of each reference positioning point, and obtain the precise positioning location information of the service equipment by correcting, based on the comprehensive deviation information, the rough positioning location information of the service equipment.

According to a further aspect of the present disclosure, an electronic device is provided. The electronic device may include a processor, a storage medium, and a bus. The storage medium may store machine-readable instructions executable by the processor, and when the electronic device operates, the processor may communicate with the storage medium through the bus, and the processor may execute the machine-readable instructions to execute the steps of the positioning method of the present disclosure.

According to a further aspect of the present disclosure, a computer-readable storage medium is provided. The computer-readable storage medium may include a computer program that, when executed by at least one processor, direct the at least one processor to perform the positioning method of the present disclosure.

According to the positioning method of the present disclosure, after the rough positioning location information of the service equipment is obtained, a reference positioning point corresponding to the service equipment may be determined based on the rough positioning location information of the service equipment. Further, the positioning deviation information of the reference positioning point may be determined based on precise positioning location information of the reference positioning point and rough positioning location information of the reference positioning point. Further, the precise positioning location information of the service equipment may be determined based on the positioning deviation information of the reference positioning point and the rough positioning location information of the service equipment.

Accordingly, when there are a plurality of service equipments, in some embodiments of the present disclosure, the backend server of the service equipments may uniformly obtain the precise positioning location information of some positioning points from a positioning platform, and then determine, according to the rough positioning location information of each service equipment and the positioning deviation information of the positioning point corresponding to the service equipment, the precise positioning location information of the service equipment. That is, the present disclosure provides a method for obtaining the precise positioning location information of the service equipment. When the service equipment is a shared vehicle, the present disclosure provides a method for obtaining precise positioning location information of the shared vehicle.

BRIEF DESCRIPTION OF THE DRAWINGS

The present disclosure is further described in terms of exemplary embodiments. These exemplary embodiments are described in detail with reference to the drawings. It should be understood that the following drawings only show certain embodiments of the present disclosure, and should not be regarded as limiting the scope of the present disclosure. For those skilled in the art, other related drawings can be obtained based on these drawings.

DETAILED DESCRIPTION

Figure 1:
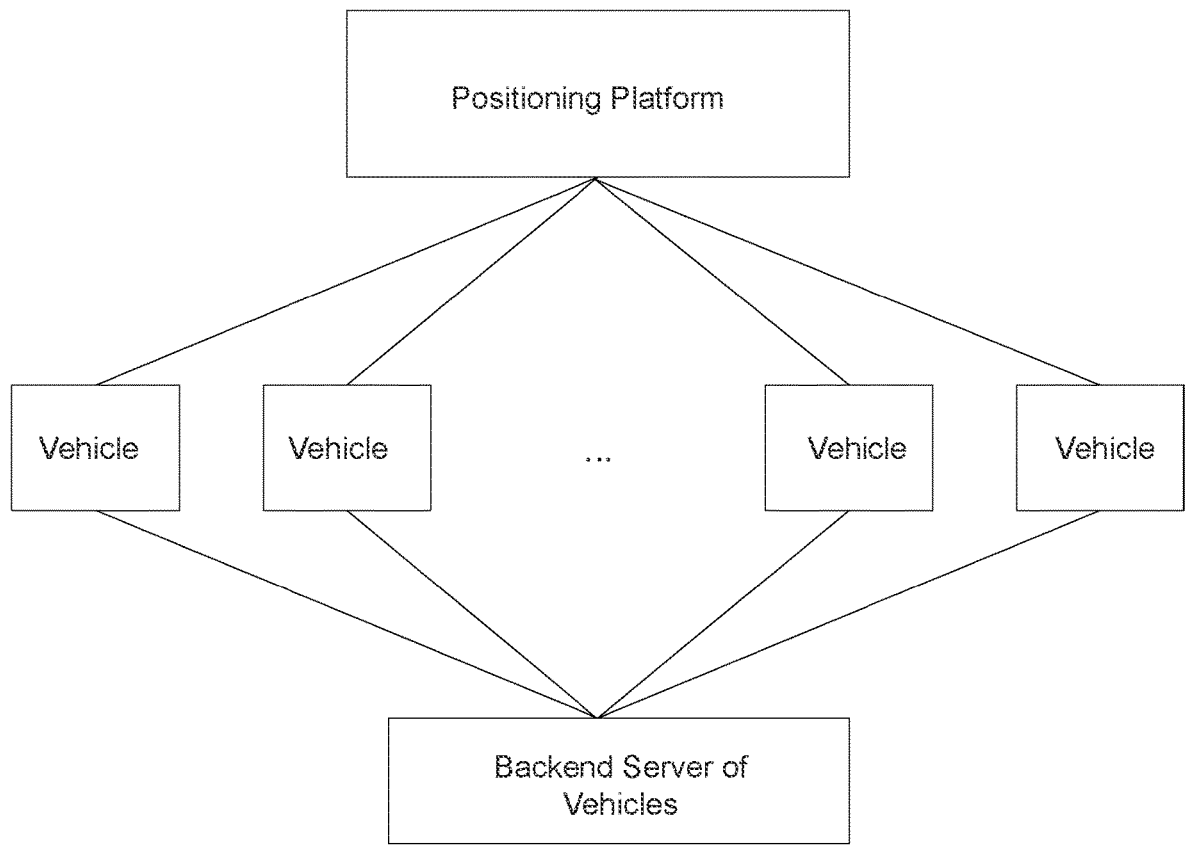
FIG. 1 is a schematic diagram illustrating an exemplary positioning system according to some embodiments of the present disclosure.

In order to make the purpose, technical solutions and advantages of the embodiments of the present disclosure clearer, the technical solutions in the embodiments of the present disclosure will be described clearly and completely in conjunction with the drawings in the embodiments of the present disclosure below. It should be understood that in the present disclosure, the drawings are only for the purpose of illustration and description, and are not used to limit the protection scope of the present disclosure. In addition, it should be understood that the schematic drawings are not drawn to scale. The flowchart used in the present disclosure shows operations implemented according to some embodiments of the present disclosure. It should be understood that the operations of the flowchart may be implemented out of order, and steps without a context relation in logic may be reversed in order or implemented at the same time. In addition, under the guidance of the content of the present disclosure, those skilled in the art can add one or more other operations to the flowchart, or remove one or more operations from the flowchart.

In addition, the described embodiments are only a part of the embodiments of the present disclosure, rather than all the embodiments. In general, the components of the embodiments of the present disclosure described and shown in the drawings herein may be arranged and designed in various configurations. Therefore, the following detailed description of the embodiments of the present disclosure provided in the drawings is not intended to limit the protection scope of the present disclosure, but merely represents selected embodiments of the present disclosure. Based on the embodiments of the present disclosure, all other embodiments obtained by those skilled in the art without creative work shall fall within the protection scope of the present disclosure.

In order to enable those skilled in the art to use the content of the present disclosure, the following implementation methods are given in conjunction with "a positioning method for a shared vehicle" in specific application scenarios. For those skilled in the art, the general principles defined here can be applied to other embodiments and application scenarios (e.g., transportation tools or mobile devices) without departing from the spirit and scope of the present disclosure. Although the present disclosure mainly focuses on the description of the positioning method for the shared vehicle, it should be understood that this is merely an exemplary embodiment.

It should be noted that the term "include" will be used in the embodiments of the present disclosure to indicate the existence of the features declared thereafter, but it does not exclude the addition of other features.

As shown in FIG. 1, a positioning system may include a positioning platform, a plurality of shared vehicles, and a backend server for the shared vehicles. The positioning platform may be based on a Global Positioning System (GPS), a Global Navigation Satellite System (GLONASS), a Galileo positioning system, or the like, or any combination thereof. When the positioning platform receives a rough positioning request sent by a request terminal, the positioning platform may send the rough positioning location information of the request terminal to the request terminal, and when the positioning platform receives a precise positioning request sent by the request terminal, the positioning platform may send the precise positioning location information of the request terminal to the request terminal. The accuracy of the precise positioning location information may be greater than the accuracy of the rough positioning location information.

In some embodiments, in addition to positioning based on the aforementioned systems, the positioning platform may also perform the positioning based on the BeiDou Navigation Satellite System, or may also perform the positioning through other positioning methods such as a satellite-based positioning method, a base station-based positioning method, a WiFi access point-based positioning method, a picture taking-based positioning method, etc. For example, when the positioning is performed through a base station, location information of the equipment to be positioned may be obtained based on a time difference and/or a signal strength of the communication between the base station and the equipment to be positioned. As another example, when the positioning is performed through a WiFi access point, the location information of the equipment to be positioned may be determined by determining a location of the WiFi access point and a distance between the equipment to be positioned and the WiFi access point. As a further example, when the positioning is performed by taking pictures, a road sign may be recognized based on an image and/or video taken by the equipment to be positioned, and location information of the equipment to be positioned may be obtained based on relative positions of the road sign and the equipment to be positioned. In addition, the positioning platform may also arbitrarily combine the above positioning systems or positioning methods to implement its positioning function.

In some embodiments, the backend server may be used to process information and/or data relating to positioning. The backend server may be an independent server or a server group. The server group may be centralized or distributed (e.g., the backend server may be a distributed system). In some embodiments, the backend server may be regional or remote. For example, the backend server may access information and/or data stored on the user terminal, the service equipment, and/or the positioning platform through a network. In some embodiments, the backend server may be directly connected to the user terminal, the service equipment and/or the positioning platform to access the information and/or data stored thereon. In some embodiments, the backend server may be implemented on a cloud platform. For example, the cloud platform may include a private cloud, a public cloud, a hybrid cloud, a community cloud, a distributed cloud, an internal cloud, or the like, or any combination thereof.

In some embodiments, the backend server may include a processing device. The processing device may process data and/or information related to a service request to perform one or more functions described in the present disclosure. For example, the processing device may provide the user terminal with precise location information of a shared vehicle to be used based on the user's request for using the shared vehicle acquired from the user terminal. In some embodiments, the processing device may include one or more sub-processing devices (e.g., a single-core processing device or a multi-core processing device). Merely by way of example, the processing device may include a central processing unit (CPU), an application-specific integrated circuit (ASIC), an application-specific instruction-set processor (ASIP), a graphics processing unit (GPU), a physical processor unit (PPU), a digital signal processor (DSP), a field programmable gate array (FPGA), a programmable logic device (PLD), a controller, a microcontroller unit, a reduced instruction set computer (RISC), a microprocessor, or the like, or any combination thereof.

In some embodiments, the positioning system may also include a network and a database. The network may facilitate the exchange of data and/or information. In some embodiments, one or more components of the positioning system (e.g., the backend server, the positioning platform, the user terminal, or the database) may send data and/or information to other components of the positioning system through the network. For example, the backend server may obtain the rough positioning location information of the service equipment from the positioning platform through the network. In some embodiments, the network may be any type of wired or wireless network. For example, the network may include a cable network, a wired network, an optical fiber network, a telecommunication network, an internal network, an Internet network, a local area network (LAN), a wide area network (WAN), a wireless local area network (WLAN), a metropolitan area network (MAN), a public switched telephone network (PSTN), a Bluetooth network, a ZigBee network, a near field communication (NFC) network, or the like, or any combination thereof. In some embodiments, the network may include one or more network access points. For example, the network may include wired or wireless network access points, such as base station and/or Internet exchange points, through which one or more components of the positioning system may be connected to the network to exchange data and/or information.

The database may store information and/or instructions. In some embodiments, the database may store information acquired from the user terminal or the positioning platform. In some embodiments, the database may store information and/or instructions that the backend server may execute or use to perform exemplary methods described in the present disclosure. In some embodiments, the database may include a mass memory, a removable memory, a volatile read-write memory (e.g., a random access memory (RAM)), a read-only memory (ROM), or the like, or any combination thereof. In some embodiments, the database may be implemented on a cloud platform. For example, the cloud platform may include a private cloud, a public cloud, a hybrid cloud, a community cloud, a community cloud, a distributed cloud, an internal cloud, or the like, or any combination thereof.

In some embodiments, the database may be connected to a network to communicate with one or more components of the positioning system (e.g., the backend server, the user terminal, etc.). One or more components of the positioning system may access the data or instructions stored in the database via the network. In some embodiments, the database may be directly connected to or directly communicate with one or more components (e.g., the backend server, the user terminal, etc.) of the positioning system. In some embodiments, the database may be part of the backend server.

In some embodiments, one or more components of the positioning system (e.g., the backend server, the user terminal, etc.) may have permission to access the database. In some embodiments, when one or more conditions are satisfied, one or more components of the positioning system (e.g., the backend server, the user terminal, etc.) may read and/or modify information related to the user and/or known common sense.

Generally, when the backend server of shared vehicles needs to know the precise location information of the shared vehicles, each shared vehicle may send a precise positioning request to the positioning platform based on its registered account, and obtain the precise positioning location information, and then send the precise positioning location information to the backend server. This may require each shared vehicle to register an account and initiate a precise positioning request. As a result, a plurality of precise positioning requests may be sent to the positioning platform, which may cause a large consumption of network resources. In such cases, the present disclosure provides a positioning method and device, an electronic device, and a storage medium, which may be applied to any scenario that needs to position shared vehicles. The shared vehicles may include a shared bicycle, a shared moped, a shared electric vehicle, or a shared car. The positioning method provided in the present disclosure will be described in detail below through specific embodiments.

Figure 2:
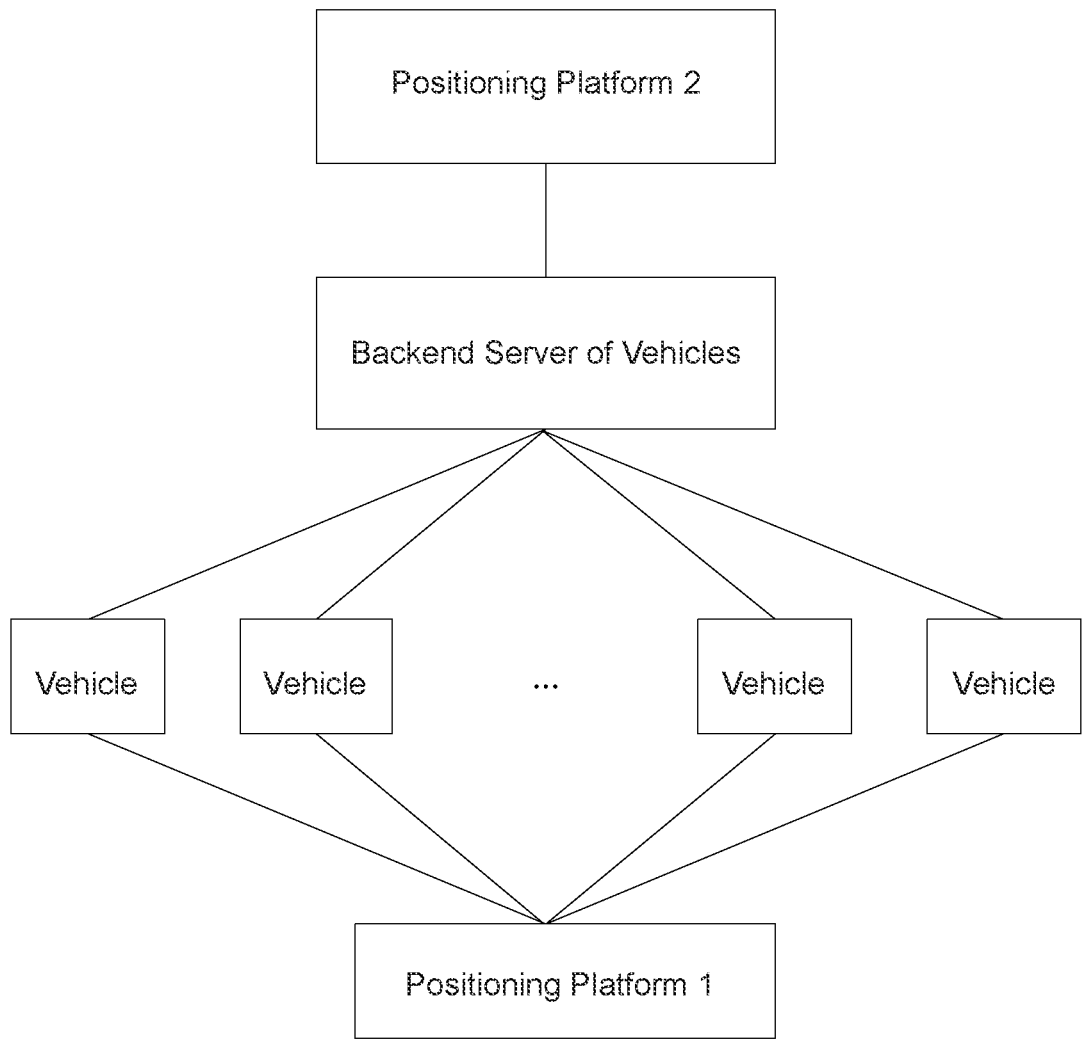
FIG. 2 is a schematic diagram illustrating another exemplary positioning system according to some embodiments of the present disclosure.

Before introducing the positioning method of the embodiments of the present disclosure, a precise positioning system provided by an embodiment of the present disclosure may be introduced. As shown in FIG. 2, the precise positioning system may include a positioning platform 1, a positioning platform 2, a plurality of shared vehicles, and a backend server for the shared vehicles. The positioning platform 2 may be a positioning platform that provides precise positioning location information. The positioning platform 1 and the positioning platform 2 may be one positioning platform, or positioning platforms that only provide rough positioning location information. Each shared vehicle may send a rough positioning request to the positioning platform 1, and then receive the rough positioning location information returned by the positioning platform 1. And after the shared vehicle is unlocked, the shared vehicle may send a precise positioning request to the backend server for the shared vehicles. The backend server may uniformly request the positioning platform 2 in advance for precise positioning location information and the rough positioning location information of preset positioning points. When receiving the precise positioning request sent by the shared vehicle, the backend server may determine a reference positioning point corresponding to the shared vehicle in the preset positioning points according to the rough positioning location information of the shared vehicle, and then determine the precise positioning location information of the shared vehicle based on positioning deviation information of the reference positioning point and the rough positioning location information of the shared vehicle.

In some embodiments, the service equipment may be a shared vehicle, or other transportation tools (e.g., a tour bus or a delivery van), or a user terminal device (e.g., a mobile device or a wearable device). The service equipment may periodically send a rough positioning request to the positioning platform 1 and store the rough positioning location information after receiving the rough positioning location information. The backend server may periodically send a positioning information request of preset positioning points to the positioning platform 2 to obtain the precise positioning location information and the rough positioning location information of the preset positioning points, and store the precise positioning location information and the rough positioning location information of the preset positioning points.

The following will take a shared vehicle as an example for illustration. It should be understood that this is only an exemplary embodiment and does not limit the application scope of the present disclosure.

Figure 3:
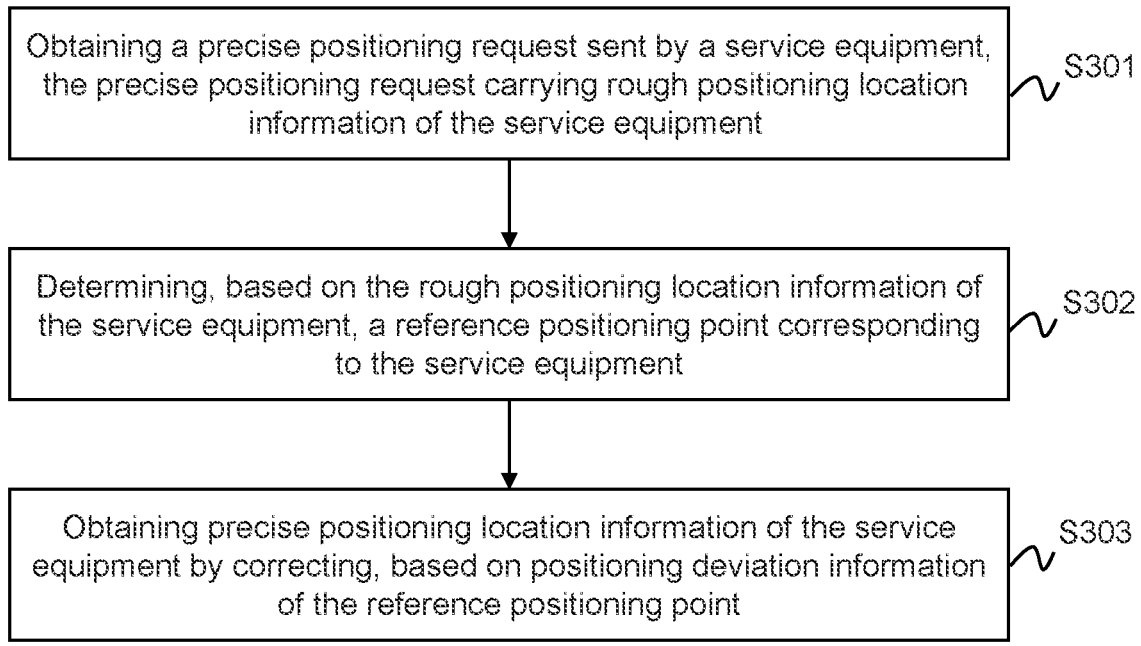
FIG. 3 is a flowchart illustrating an exemplary positioning process performed on a backend server according to some embodiments of the present disclosure.

A positioning method provided by some embodiments of the present disclosure is described in detail below. The positioning method may be applied to a backend server. The backend server may be a backend server of shared vehicles. As shown in FIG. 3, the positioning method may include the following steps S301~S303:

S301: a precise positioning request sent by a service equipment may be obtained. the precise positioning request may carry rough positioning location information of the service equipment.

In some embodiments of the present disclosure, the service equipment may be a shared vehicle or an electronic device on a shared vehicle, such as a shared bicycle, a shared electric vehicle, a shared moped or a shared car, or an electronic device on a shared bicycle, a shared electric vehicle, a shared moped or a shared car.

In some embodiments, the service equipment may be an equipment that provides services and does not have a fixed location, and the service equipment may be generally movable. In addition to a shared vehicle or an electronic device on a shared vehicle, the service equipment may also be a vehicle that needs to be accurately positioned, such as a tour bus or a delivery van, or an electronic device (e.g., a positioning chip) disposed on items. In addition, the service equipment may also be a mobile device (e.g., a mobile phone or a laptop computer), a smart wearable device, etc. of a user (e.g., a delivery person or a driver of a shared car). Generally, the service equipment may be various types of transportation tools, or various types of electronic devices or various items provided with an electronic device.

In some embodiments, the precise positioning request may be data sent by the service equipment to the backend server for requesting the backend server to transmit the precise positioning location information of the service equipment. In some embodiments, the data of the precise positioning request may carry the rough positioning location information of the service equipment. In some embodiments, the rough positioning location information may not be carried in the data of the precise positioning request. For example, the rough positioning location information may be directly sent by the positioning platform 1 to the backend server. For another example, after sending a precise positioning request to the backend server, the service equipment may send the rough positioning location information to the backend server after receiving a request from the backend server for sending the rough positioning location information.

The rough positioning location information may be positioning location information with low accuracy and may only reflect an approximate location of the service equipment (which may deviate from an actual location of the service equipment). The rough positioning location information may be acquired in real-time before the precise positioning request is sent. The positioning method of the present disclosure may determine the precise positioning location information of the service equipment based on the rough positioning location information obtained by the service equipment, and may achieve precise positioning without requiring the service equipment to have high positioning accuracy, which may greatly reduce the cost of the service equipment. In order to ensure the accuracy of the rough positioning location information, the rough positioning location information of the service equipment may include a rough positioning location or a plurality of rough positioning locations. When the rough positioning location information includes a plurality of locations, a rough positioning estimated location may be obtained after processing the plurality of locations, which may avoid the influence of a certain location with a large deviation on the accuracy of the precise positioning location information.

In some embodiments, the methods for obtaining the rough positioning location information of the service equipment may include obtaining the rough positioning location information based on positioning methods such as the GPS positioning method, the BeiDou positioning method, the global navigation satellite positioning, other satellite-based positioning methods, the Galileo positioning method, the base station-based positioning method, the picture taking-based positioning method, etc. For example, when the positioning is performed through a base station, the rough positioning location information of the service equipment may be obtained based on a time difference and/or a signal strength of communication between the base station and the service equipment. As another example, when the positioning is performed by taking pictures, a road sign may be recognized based on an image and/or a video taken by the service equipment, the rough positioning location information of the service equipment may be obtained based on the relative positions of the road sign and the service equipment. More information regarding the positioning method may be found in FIG. 1 and relevant descriptions thereof, which will not be repeated here.

In some embodiments, the rough positioning location information of the service equipment may be obtained at a preset time interval and stored on the service equipment, or the rough positioning location information of the service equipment may also be obtained in real-time. In some embodiments, the rough positioning location information of the service equipment may be uploaded to the database of the backend server periodically or in real-time. When receiving a precise positioning request, without interacting with the service equipment, the backend server may obtain the rough positioning location information of the service equipment from the database, which may shorten the obtaining time of the precise positioning location information.

For example, when the service equipment is a shared vehicle, after the user unlocks the shared vehicle, the shared vehicle may send a precise positioning request to the backend server of shared vehicles. The precise positioning request may carry the rough positioning location information of the service equipment. The rough positioning location information may be free and low-accuracy positioning location information requested by the shared vehicle from the positioning platform. The accuracy of the rough positioning location information may be less than that of the precise positioning location information. When the rough positioning location information includes parameters indicating a rough positioning location of the shared vehicle, a processor on the shared vehicle may need to process the parameters to obtain the rough positioning location of the shared vehicle. Compared with the prior art in which the processor needs to process the parameters indicating a precise positioning location of the shared vehicle, the resource consumption of the processor in the present disclosure is less than that of the processor when the precise positioning location information is processed. In addition, a precise positioning of the service equipment is achieved to facilitate users to obtain the precise location of the service equipment, and the cost of the service equipment may be reduced.

As another example, when the backend server of shared vehicles receives a precise positioning request sent by the shared vehicle, the backend server may send a positioning instruction to the shared vehicle, the shared vehicle may request the positioning platform 1 for obtaining rough positioning location information of the shared vehicle and send the rough positioning location information to the backend server. Or, after the backend server of shared vehicles receives the precise positioning request sent by the shared vehicle, the backend server may directly obtain the rough positioning location information of the shared vehicle stored in a database. The backend server may obtain the rough positioning location information of the service equipment from the database without interacting with the service equipment, which may shorten the time for obtaining the precise positioning location information.

S302: a reference positioning point corresponding to the service equipment may be determined based on the rough positioning location information of the service equipment.

After receiving the precise positioning request of the service equipment, the backend server may determine the reference positioning point corresponding to the service equipment based on the rough positioning location information of the service equipment carried by the precise positioning request. The reference positioning point refers to a point for reference when the precise position of the service equipment is determined. That is, the reference positioning point may be a positioning point selected from a plurality of positioning points for precise positioning of the service equipment.

In some embodiments, after the reference positioning point is determined, location information of the reference positioning point may be further determined. The location information of the reference positioning point may include precise positioning location information and rough positioning location information. The rough positioning location information of the reference positioning point may be positioning location information with low accuracy and may only reflect an approximate location of the reference positioning point (which may deviate from an actual location of the reference positioning point. The precise location information of the reference positioning point may be positioning location information that may truly reflect the actual location of the reference positioning point (which has almost no difference or a very small difference from the actual location of the reference positioning point). The precise positioning location information may be pre-stored in the database of the backend server, or may be stored in an independent database and then retrieved by the backend server. The rough positioning location information may be pre-stored on the backend server, or may be acquired by the backend server in real-time after receiving a precise positioning request.

In some embodiments, the reference positioning point may be selected from some positioning points. For example, some positioning points may be preliminarily screened based on the rough positioning location information of the service equipment to obtain a plurality of positioning points, and then a reference positioning point may be further determined from the plurality of positioning points screened out. In some embodiments, screening out the plurality of positioning points from some positioning points may include delimiting a preliminary screening region with the rough positioning location as a center, for example, delimiting a circular region with the rough positioning location as the center of the circle and a preset radius range (e.g., 5 m), selecting positioning points in the preliminary screening region, and then determining the reference positioning point from the positioning points in the preliminary screening region.

In some embodiments, a method for determining the reference positioning point may include determining coordinates of the rough positioning location and some positioning points, screening out a plurality of positioning points that are closer to the rough positioning location based on the coordinate of the rough positioning location and the coordinates of each positioning point (e.g., screening out the positioning points with a distance from the rough positioning location less than a preset distance (e.g., 5 m)), and then determining the reference positioning point from the plurality of positioning points that are closer to the rough positioning location. More descriptions regarding determining the reference positioning point may be found in FIG. 4 and relevant descriptions thereof, which will not be repeated here.

In some embodiments, in the preliminary screening of the positioning points, a plurality of positioning regions may be delimited, and a field corresponding to each positioning point may be stored in the backend server. The field may indicate the positioning region where each positioning point is located. After the rough positioning location information of the service equipment is obtained, the positioning region where the service equipment is located may be determined, and the positioning points located in the positioning region may be preliminarily screened out by querying the field corresponding to the positioning region. In some alternative embodiments, in the preliminary screening of the positioning points, a plurality of positioning regions may be delimited, each positioning region may be numbered, and then each positioning point in each positioning region may be numbered, thereby creating a positioning region-positioning point index table based on the numbers of the positioning regions and the numbers of corresponding positioning points. After the rough positioning location information of the service equipment is obtained, the positioning region where the service equipment is located may be determined, and the index table may be queried to preliminarily screen out the positioning points belonging to the positioning region. More description regarding determining the reference positioning point in the positioning region may be found in FIG. 5 and relevant descriptions thereof, which will not be repeated here.

By preliminarily screening the positioning points, when there are a large count of positioning points, the reference positioning point may be determined without processing a large count of positioning points, which may reduce the computing load of the backend server.

Figure 4:
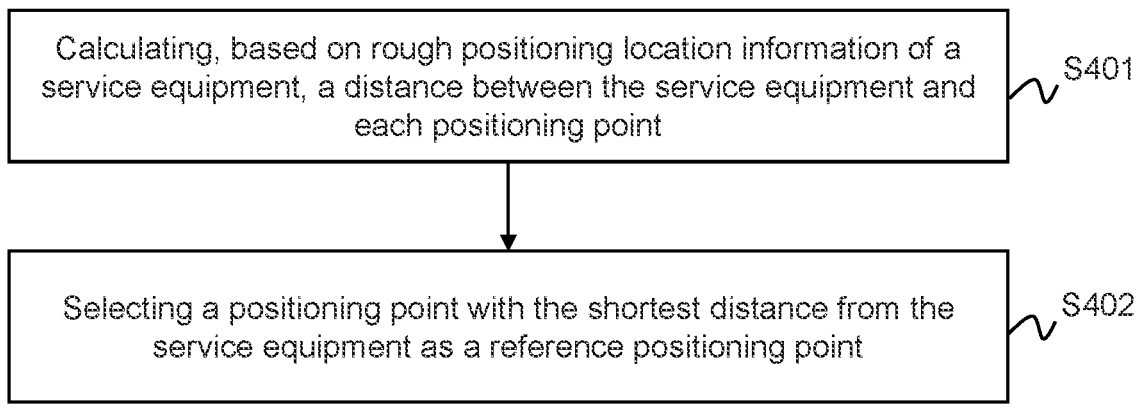
FIG. 4 is a flowchart illustrating an exemplary process for determining a reference positioning point performed on a backend server according to some embodiments of the present disclosure.

In some embodiments, as shown in FIG. 4, step S302 for determining the reference positioning point corresponding to the service equipment based on the rough positioning location information of the service equipment may include the following steps S401 to S402:

S401: a distance between the service equipment and each positioning point may be calculated based on the rough positioning location information of the service equipment;

S402: a positioning point with the shortest distance from the service equipment may be selected as the reference positioning point.

For example, the backend server of shared vehicles may set a plurality of positioning points in a region in advance, and request the positioning platform for the rough and precise positioning location information of the positioning points at the same time such that the backend server may store the location information of the positioning points.

In some embodiments, the reference positioning point may be fixed. The positioning points may be location points of some preset parking piles, such as a plurality of parking piles set in a region. The parking piles may be used to indicate parking locations. The positioning point may also be a location point in a region where traffic buildings of a city are located, such as a location point in a region where a bus stop sign is located, which will not be specifically limited here.

In some embodiments, the reference positioning point may be not fixed. That is, the reference positioning point may be a time-sensitive location point. For example, the reference positioning point may be a location point at which precise positioning location information has been determined within a previous period (e.g., 10 minutes or 30 minutes) with other shared vehicles in the positioning system. For example, when a passenger on a shared vehicle A got off 8 minutes ago, the backend server had determined the precise positioning location information of the drop-off point. When determining precise positioning location information of a shared vehicle B, the drop-off point of the passenger on the shared vehicle A may be used as the reference positioning point. It may be understood that since more than one shared vehicle is precisely positioned in the positioning system, there may be a plurality of drop-off points that may be used as the reference positioning points for the shared vehicle B.

After the backend server obtains the rough positioning location information of the service equipment, the backend server may calculate the distance between the service equipment and each positioning point based on the rough positioning location information of the service equipment and the rough positioning location information of each positioning point, or calculate the distance between the service equipment and each positioning point based on the rough positioning location information of the service equipment and the precise positioning location information of each positioning point. The backend server may also calculate average positioning location information of each positioning point based on the rough positioning location information and precise positioning location information of each positioning point. For example, the backend server may obtain the average positioning location information of each positioning point by averaging the rough positioning location information and the precise positioning location information of each positioning point. Further, the backend server may calculate the distance between the service equipment and each positioning point based on the rough positioning location information of the service equipment and the average positioning location information of each positioning point.

Any of the above manners may be used to calculate the distance between the service equipment and each positioning point, which is not specifically limited here. Further, a positioning point with the shortest distance from the service equipment may be selected as the reference positioning point. For example, there are 100 positioning points set in Haidian, Beijing, the distance differences between the service equipment and the 100 positioning points may be calculated, and a positioning point A located in Zhongguancun with the shortest distance from the service equipment may be determined as the reference positioning point.

Figure 5:
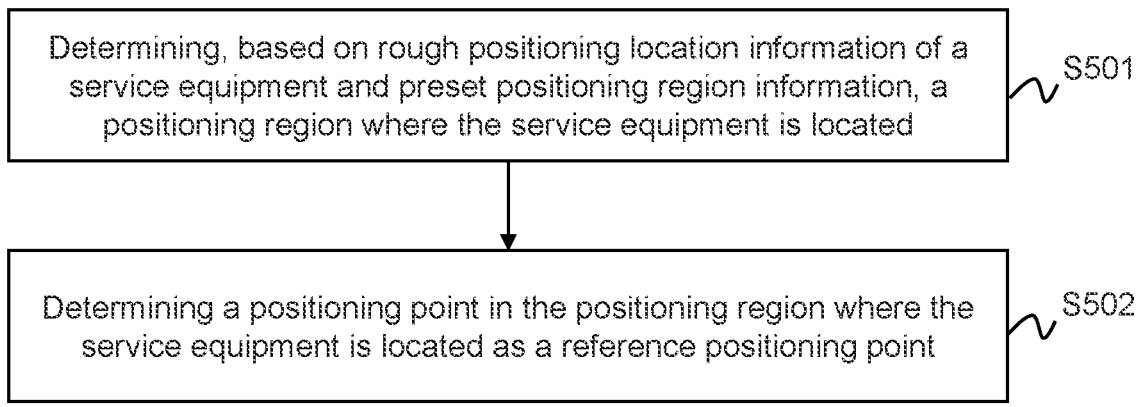
FIG. 5 is a flowchart illustrating an exemplary process for determining a reference positioning point performed on another backend server according to some embodiments of the present disclosure.

In some embodiments, as shown in FIG. 5, step S302 for determining the reference positioning point corresponding to the service equipment based on the rough positioning location information of the service equipment may include:

S501: positioning region where the service equipment is located may be determined based on the rough positioning location information of the service equipment and preset positioning region information;

S502: a positioning point in the positioning region where the service equipment is located may be determined as the reference positioning point.

The positioning region information may be edge coordinate information of a plurality of positioning regions obtained by dividing a region in advance. For example, Haidian, Beijing may be divided according to the longitude and the latitude to obtain a plurality of positioning regions, or Haidian, Beijing may be divided to obtain a plurality of positioning regions based on a set length and width.

The edge coordinate information of each positioning region may be stored in advance. After the rough positioning location information of the service equipment is received, the positioning region where the service equipment is located may be determined based on the rough positioning location information and the edge coordinate information of each positioning region. Further, a positioning point in the positioning region may be determined as the reference positioning point. For example, a center point in the positioning region may be selected as the reference positioning point. Of course, a plurality of set positioning points may also be selected as reference positioning points. More description regarding the positioning point may be found in FIG. 4 and relevant descriptions thereof, and will not be repeated here.

Figure 6:
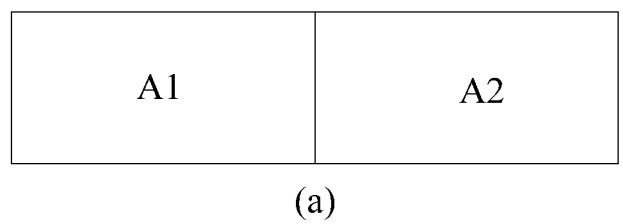
FIG. 6 is a schematic diagram illustrating an exemplary position relationship of adjacent positioning regions according to some embodiments of the present disclosure.
Figure 6:
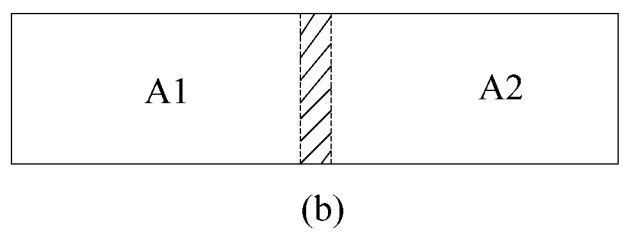

In the positioning region, as shown in FIG. 6(*a*), edges of two adjacent positioning regions may be close to each other, or as shown in FIG. 6(*b*), edges of two adjacent positioning regions may overlap with each other.

According to FIG. 6, two adjacent positioning regions may have two positional relationships. That is, the edges are close to each other in (a) and the edges overlap with each other in (b). When the rough positioning location information of the service equipment points to edge regions of two adjacent positioning regions, in order to prevent that the precise positioning location is inaccurate if the precise positioning location information of the service equipment is determined merely based on the positioning points in positioning region A1 in the case where the rough positioning location information of the service equipment belongs to positioning region A1 while the precise positioning location information of the service equipment belongs to positioning region A2, the edges of the two adjacent positioning regions may be set to overlap with each other. If the rough positioning location information of the service equipment belongs to the overlapping region, the reference positioning point may be determined based on the positioning points in both the positioning region A1 and the positioning region A2 such that the precise positioning location information of the service equipment may be determined more accurately.

In some embodiments, after a plurality of positioning points are screened out, 360° direction angle may be divided into several (e.g. 4, 6, or 8) direction sections with the rough positioning location as the center. One or more reference positioning points may be determined in each direction section such that reference positioning points may be distributed in different directions around the rough positioning location. That is, a plurality of reference positioning points may be distributed more evenly around the rough positioning location of the service equipment, which may prevent that the positioning deviation information of the reference positioning point cannot indicate positioning deviation information of the service equipment due to local environmental factors.

In some embodiments, when the service equipment is moving, the backend server may also obtain information on roads around the rough positioning location of the service equipment. The backend server may further select a positioning point that is located on one side or both sides of the road where the service equipment is located and is closer to the rough positioning location (e.g., a road lamp) as the reference positioning point based on the information on the roads. In some embodiments, when the service equipment is moving, the backend server may also obtain information on a traveling direction and a speed of the service equipment. The backend server may further determine the reference positioning point based on the information on the traveling direction and the speed. For example, a positioning point located in front of the rough positioning location of the service equipment in the traveling direction and separated from the rough positioning location by a preset distance (e.g., a center point of an intersection) is may be selected as the reference positioning point.

In some embodiments, after the reference positioning point is determined, the precise positioning location information of the service equipment may be determined as follows:

S303: precise positioning location information of the service equipment may be obtained by correcting the rough positioning location information of the service equipment based on positioning deviation information of the reference positioning point.

The precise positioning location information of the service equipment may be positioning location information that may truly reflect the actual location of the service equipment (which almost has no difference or has a small difference from the actual location of the service equipment). The precise positioning location information of the service equipment may include horizontal geographic coordinates (e.g., GPS coordinates or latitude and longitude), or vertical height (e.g., altitude or height from the ground). When the service equipment is in a highly built bridge region or in a high-rise building region, the vertical height may assist in indicating the location of the service equipment (e.g., indicating whether the service equipment is on or under the highly built bridge, or on which floor of the high-rise building the service equipment is located). In such cases, the determined precise positioning location information of the service equipment may be more comprehensive and more accurate.

The positioning deviation information of the reference positioning point may be calculated based on the precise positioning location information of the reference positioning point and the rough positioning location information of the reference positioning point. The positioning deviation information may include a distance deviation in one aspect, or include a direction deviation in another aspect. The direction deviation may also be referred to as a relative setting coordinate system angle. For example, the precise positioning location information of the reference positioning point may move 3 meters toward the southeast direction (that is, in the 45° direction between the due east and the due south) relative to the rough positioning location information of the reference positioning point.

In some embodiments, when the precise positioning location information further includes the vertical height, the distance deviation in the positioning deviation information of the reference positioning point may further include a distance deviation in the horizontal direction and a distance deviation in the vertical direction.

The positioning deviation information may be positioning deviation information of the reference positioning point determined by the positioning platform when the backend server of shared vehicles obtains the location information of the reference positioning point from the positioning platform, or positioning deviation information determined by the backend server based on the precise positioning location information of the reference positioning point and the rough positioning location information of the reference positioning point sent by the positioning platform.

When the positioning deviation information of the reference positioning point is determined, an absolute distance difference of the reference positioning point may be calculated based on the precise positioning location information and the rough positioning location information of the reference positioning point. For example, a coordinate system may be set first, and then a coordinate vector of the precise positioning location and a coordinate vector of the rough positioning location of the reference positioning point may be determined based on the coordinate system. Further, a positioning offset vector of the precise positioning location relative to the rough positioning location may be determined based on the two coordinate vectors (the positioning offset vector may be expressed in the form of three-dimensional coordinates, for example, the three-dimensional coordinates may correspond to offset amounts in the due east, due south, and vertical direction respectively), and after the coordinates of the service equipment in the coordinate system are determined based on the rough positioning location information of the service equipment, the location of the service equipment may be corrected based on the positioning offset vector of the reference positioning point and the coordinates of the service equipment in the coordinate system. For example, if the precise positioning location information of the reference positioning point moves 3 meters toward the southeast direction relative to the rough positioning location information of the reference positioning point, the precise positioning location information of the service equipment may be obtained by moving the rough positioning location information of the service equipment 3 meters toward the southeast direction.

In some embodiments, the positioning deviation information of the reference positioning point may be pre-stored in the backend server, or the precise positioning location information and rough positioning location information of the reference positioning point may be stored in the backend server. After the backend server receives a precise positioning request sent by the service equipment, the positioning deviation information of the reference positioning point may be determined based on the precise positioning location information and the rough positioning location information of the reference positioning point.

Figure 7:
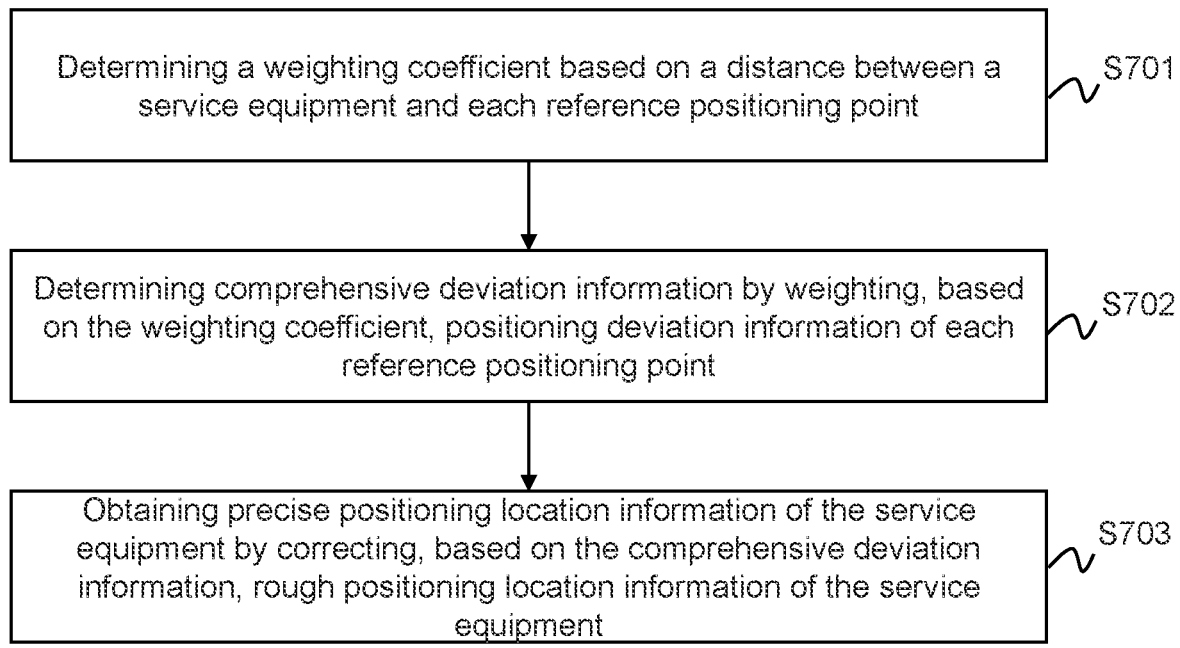
FIG. 7 is a flowchart illustrating an exemplary process for correcting rough positioning location information performed on a backend server according to some embodiments of the present disclosure.

The above description is a method for determining the precise positioning location information of the service equipment for one reference positioning point. To further improve the accuracy of the location of the service equipment, a plurality of reference positioning points may be set. When there are a plurality of reference positioning points, as shown in FIG. 7, the obtaining the precise positioning location information of the service equipment by correcting the rough positioning location information of the service equipment based on the positioning deviation information of the reference positioning point in step S303 may include the following steps S701 to S703:

S701: a weighting coefficient may be determined based on a distance between the service equipment and each reference positioning point.

The distance may be a distance calculated based on the rough positioning location information of the reference positioning point and the rough positioning location information of the service equipment.

S702: comprehensive deviation information may be determined by weighting positioning deviation information of each reference positioning point based on the weighting coefficient.

S703: precise positioning location information of the service equipment may be obtained by correcting the rough positioning location information of the service equipment based on the comprehensive deviation information.

For example, if there are n reference positioning points and the distance between each reference positioning point and the service equipment is h, the weighting coefficient w of the k-th reference positioning point may be determined according to the following formula:

$$w_{i=k} = \frac{h_{i=k}}{\sum_{i=1}^{n} h_i}$$

where $w_{i=k}$ denotes a weighting coefficient of the k-th reference positioning point, $h_{i=k}$ denotes a distance between the k-th reference positioning point and the service equipment, $k \in (1,n)$, and $h_i$ denotes a distance between the i-th reference positioning point and the service equipment. The denominator of the formula may be the distance between each of the reference positioning points and the service equipment, and the weighting coefficient corresponding to each reference positioning point may be determined according to this formula.

After the weighting coefficient of each reference positioning point is determined, the comprehensive deviation information E may be calculated according to the following formula:

$$E = \sum_{i=1}^{n} w_i \cdot p_i$$

where $p_i$ denotes positioning deviation information corresponding to the i-th reference positioning point. The positioning deviation information may include a deviation distance and a deviation angle.

After the comprehensive deviation information is obtained, the rough positioning location information of the service equipment may be corrected based on the comprehensive deviation information. The specific correction process may be similar to the aforementioned process for correcting the location of the service equipment based on one reference positioning point. For example, if there are three reference positioning points, a distance between a first reference positioning point and the service equipment is 3 m, a distance between the second reference positioning point and the service equipment is 2 m, and a distance between a third reference positioning point and the service equipment is 5 m, the weighting coefficient corresponding to the first reference positioning point may be 0.3, the weighting coefficient corresponding to the second reference positioning point may be 0.2, and the weighting coefficient corresponding to the third reference positioning point may be 0.5. If the positioning deviation information corresponding to the first reference positioning point is such that the precise positioning location information moves 2 m toward a direction of 30 degrees southeast by east relative to the rough positioning location information, the positioning deviation information corresponding to the second reference point is such that the precise positioning location information moves 2.2 m toward a direction of 32 degrees southeast by east relative to the rough positioning location information, and the positioning deviation information corresponding to the third reference point is such that the precise positioning location information moves 1.8 m toward a direction of 28 degrees southeast by east relative to the rough positioning location information, the deviation angle in the comprehensive deviation information may be: 30*0.3+32*0.2+28*0.5=29.4 (degrees), and the deviation distance in the comprehensive deviation information may be: 2*0.3+2.2*0.2+1.8*0.5=1.94 (m). That is, the precise positioning location information of the service equipment may be obtained by moving the rough positioning location information of the service equipment 1.94 m toward the direction of 29.4 degrees southeast by east.

In some embodiments, if there are a plurality of reference positioning points, when the weighting coefficient is determined, the weighting coefficient of each reference positioning point may be determined based on update time of the positioning deviation information of each reference positioning point. For example, since the update time of the positioning deviation information determines a confidence level of location deviation information of each reference positioning point, the reference positioning point with nearer update time may have a higher confidence level, the weighting coefficient thereof may be set to be higher, and the reference positioning point with an earlier update time may have a lower confidence level, the weighting coefficient thereof may be set to be lower.

In some embodiments, the weighting coefficient may be determined based on an angle between a connection line between the reference positioning point and the service equipment and a traveling direction of the service equipment. For example, the smaller the angle, the more possible the reference positioning point is close to a traveling path of the service equipment, and the higher the weighting coefficient of the reference positioning point may be set. In such cases, when the service equipment is moving, a positioning point as close as possible to the traveling path of the service equipment may be selected as the reference positioning point based on the traveling direction of the service equipment. The positioning point close to the traveling path of the service equipment and the service equipment may have similar environmental factors (e.g., external interference or signal strength), which may prevent that the finally determined reference positioning point is too far away from the service equipment and the accuracy of the determined precise positioning location information is affected.

In some embodiments, when there are a plurality of reference positioning points, the positioning deviation information of the service equipment may be determined using a machine learning model, and the precise positioning location information of the service equipment may be further determined based on the positioning deviation information and rough positioning location information of the service equipment. In some embodiments, the machine learning model may be a neural network model. The machine learning model may determine the positioning deviation information of the service equipment (e.g., including values of the deviation angle, the deviation distance, etc. of the rough positioning location information relative to the precise positioning location information) based on the positioning deviation information of the plurality of reference positioning points input. The input of the machine learning model may include positioning deviation information of the plurality of reference positioning points. The input of the machine learning model may also include a positional relationship between the rough positioning location of the service equipment and each reference positioning point (e.g., a distance or a relative direction). In some embodiments, the input of the machine learning model may also include a moving speed of the service equipment, a type of the service equipment, a manner of obtaining a rough position, etc. The output of the machine learning model may be the positioning deviation information of the service equipment.

By using the machine learning model to determine the positioning deviation information of the rough positioning location of the service equipment, the calculation efficiency may be improved when the data amount of the positioning deviation information of reference positioning points is large. And it is possible to comprehensively consider the influence of factors such as the speed of the service equipment, the type of the service equipment, and the manner of obtaining the rough positioning location information of the service equipment on the positioning deviation information of the service equipment. Information corresponding to the above factors and the positioning deviation information of reference positioning points, etc. may be used as factors to obtain more accurate positioning deviation information of the service equipment, thereby obtaining precise positioning location information of the service equipment.

In some embodiments, when the rough positioning location information includes a plurality of rough positioning locations, a comprehensive location (e.g., an average location or a weighted average location) of the plurality of rough positioning locations may be determined first. In such cases, the calculation amount when the precise positioning location information is determined may be reduced, which may improve the efficiency of obtaining the precise positioning location information, and reduce the computing load of the backend server. In some embodiments, when the rough positioning location information includes a plurality of rough positioning locations, the plurality of positioning locations in the rough positioning location information of the service equipment may be corrected based on the positioning deviation information of reference positioning points to obtain a plurality of precise positioning locations of the service equipment. The plurality of precise positioning locations may be further processed to obtain a comprehensive location (e.g., an average location or a weighted average location) of the plurality of precise positioning locations.

In some embodiments, when the rough positioning location information includes a plurality of rough positioning locations, a machine learning model may be used to obtain a comprehensive location of the rough positioning locations of the service equipment. In some embodiments, the machine learning model may be a neural network model. The machine learning model may calculate a comprehensive location of the rough positioning locations of the service equipment. In some embodiments, the input of the machine learning model may include a plurality of rough positioning locations of the rough positioning location information of the service equipment. The output of the machine learning model may be a comprehensive location of the rough positioning locations of the service equipment.

In some embodiments, a machine learning model may be used to obtain the positioning deviation information of the service equipment based on the rough positioning location information and precise positioning location information of a plurality of reference positioning points and the rough positioning location information of the service equipment. The machine learning model may determine the positioning deviation information of the service equipment (e.g., including values of the deviation angle, the deviation distance, etc. of the rough positioning location information relative to the precise positioning location information) based on the input rough positioning location information and precise positioning location information of a plurality of reference positioning points and the rough positioning location information of the service equipment. The input of the machine learning model may include the rough positioning location information of the service equipment and the rough positioning location information and precise positioning location information of the reference positioning points, and the output of the machine learning model may be the positioning deviation information of the service equipment. In some embodiments, depending on the training sample data of the machine learning model, the output of the machine learning model may also be the precise positioning location information of the service equipment.

In some embodiments, an initial machine learning model may be obtained, and the initial machine learning model may be trained based on training sample data to generate a final machine learning model. The training sample data may include rough positioning location information and precise positioning location information of a plurality of reference positioning points and a label of each reference positioning point. The label may be used to denote the deviation of the rough positioning location information relative to the precise positioning location information of the reference positioning point. The label may include a direction and a distance, for example, (a southeast direction, 3 meters). The label may be predetermined. For example, the label may be determined based on historical data. After the training data is input into the initial machine learning model, the initial machine learning model may learn based on features and labels of the training data, and adjust parameters of the initial machine learning model. For example, the parameters may be adjusted according to the gradient descent mechanism or the back propagation mechanism. In some embodiments, the initial machine learning model may be continuously trained until a training result converges. And the final machine learning model may be generated after the training process is finished.

Based on the rough positioning location information and precise positioning location information of the reference positioning point and the rough positioning location information of the service equipment, the positioning deviation information or precise positioning location information of the service equipment may be directly determined using the machine learning model, which may simplify the calculation operation and improve the calculation efficiency, and improve the accuracy of the finally determined precise positioning location information of the service equipment.

In some embodiments, in a standardized parking application scenario, the precise positioning request may also carry an identification code of the service equipment. The service equipment may be a vehicle. After obtaining the precise positioning location information of the service equipment, the positioning method in some embodiments of the present disclosure may further include:

When receiving information indicating that the vehicle has been locked sent by the service equipment, whether the vehicle is located in a legitimate parking region may be determined based on the precise positioning location information of the service equipment and pre-stored legitimate parking region information;

In response to determining that the vehicle is not located in the legitimate parking region, the service equipment may be controlled to perform an unlocking operation, and information indicating that the vehicle cannot be locked may be sent to the user terminal associated with the identification code. In response to determining that the vehicle is located in the legitimate parking region, the service equipment may be allowed to perform the locking operation.

The legitimate parking region information refers to preset coordinate information of the legitimate parking region.

When a user finishes using a vehicle, for the vehicle that needs to be manually locked (e.g., a vehicle lock of the vehicle is a horseshoe lock), when the user finishes using the vehicle and manually closes the vehicle lock, the vehicle may send information indicating that the vehicle is locked to a backend server of vehicles. The information indicating that the vehicle is locked may be numeral information. For example, "0" means that the lock is closed. The backend server may determine whether the vehicle is located in the legitimate parking region based on the precise positioning location information of the service equipment and the coordinate information of the legitimate parking region pre-stored. That is, whether the user parks legitimately may be determined. In response to determining that the vehicle is not located in the legitimate parking region based on the precise positioning location information of the vehicle, the vehicle may be controlled to be unlocked again to make the vehicle cannot be locked, and information indicating that the vehicle lock cannot be locked may be sent to the user terminal of the user such that the user may re-park the vehicle into the legitimate parking region. In response to determining that the vehicle is located in the legitimate parking region based on the precise positioning location information of the vehicle, the vehicle may be allowed to be locked, and information indicating that the vehicle lock has been closed may be sent to the user terminal of the user such that the user knows that the vehicle is in a locked state.

The service equipment may also be a vehicle that may be automatically locked, and the user may request to close the lock by clicking a lock button on the service equipment or a lock control on the user terminal. Explanations will be given in detail below.

In some embodiment, the service equipment may be a vehicle, and after obtaining the precise positioning location information of the service equipment, the positioning method in some embodiments of the present disclosure may further include:

When receiving a locking request sent by a user terminal or a vehicle side, whether the vehicle is located in the legitimate parking region may be determined based on the precise positioning location information of the service equipment and the pre-stored legitimate parking region information.

In response to determining that the vehicle is not located in the legitimate parking region, information indicating that the vehicle cannot be locked may be sent to the user terminal.

The vehicle lock of the vehicle may be a vehicle lock that may be automatically locked, such as a hub lock. When the user finishes using the vehicle, he/she may send a locking request to the backend server through the software used for the vehicle on the user terminal, and the backend server may determine whether the vehicle is located in the legitimate parking region, that is, whether the user parks legitimately based on the precise positioning location information of the service equipment and the pre-stored coordinate information of the legitimate parking region. In response to determining that the vehicle is not located in the legitimate parking region based on the precise positioning location information of the vehicle, the vehicle may not be controlled to perform the locking operation, and information indicating that the lock cannot be locked may be sent to the user terminal of the user such that the user may re-park the vehicle in the legitimate parking region. In response to determining that the vehicle is located in the legitimate parking region based on the precise positioning location information of the vehicle, the vehicle may be allowed to be locked, the vehicle lock may be controlled to be locked, and information indicating that the vehicle lock has been locked may be sent to the user terminal such that the user may know that the vehicle is in the locked state.

In some embodiments, the precise positioning location information of the service equipment may be obtained at a preset time interval or in real-time, and a movement trajectory of the service equipment may be determined based on the precise positioning location information to collect or monitor the movement trajectory of the service equipment.

In summary, the embodiments of the present disclosure provide a precise positioning method for accurately positioning the location information of the shared vehicle, which may facilitate standardizing the legal parking of the users.

In addition, the positioning method provided by the embodiments of the present disclosure does not require the service equipment to request precise positioning location information from the positioning platform, which may reduce the consumption of network resources by the service equipment. Since the service equipment no longer needs to obtain precise positioning location information from the positioning platform, there is no need to register an account specifically for requesting a precise positioning, which may reduce the cost consumed by the service equipment. Furthermore, the service equipment does not need to receive the precise positioning location information returned by the positioning platform, and does not need to consume more resources to process the precise positioning location information, which may reduce the resource consumption of the service equipment.

In addition, after the rough positioning location information of the service equipment is obtained through less precise methods such as the base station-based positioning method or the WiFi access point-based positioning method, the precise location of the service equipment may be further obtained, which may implement precise positioning while reducing the cost of the service equipment and overcoming the disadvantages of the objective environment.

It should be understood that by adopting the positioning method of the present disclosure, even in regions with poor signals, precise positioning of the service equipment may be implemented, which may reduce the requirements for signal transmission strength (or calculation speed). In addition, in the precise positioning of the service equipment, the amount of data transmission between the backend server and the service equipment during the positioning process may be reduced, and the computing load of the backend server may be reduced.

Figure 8:
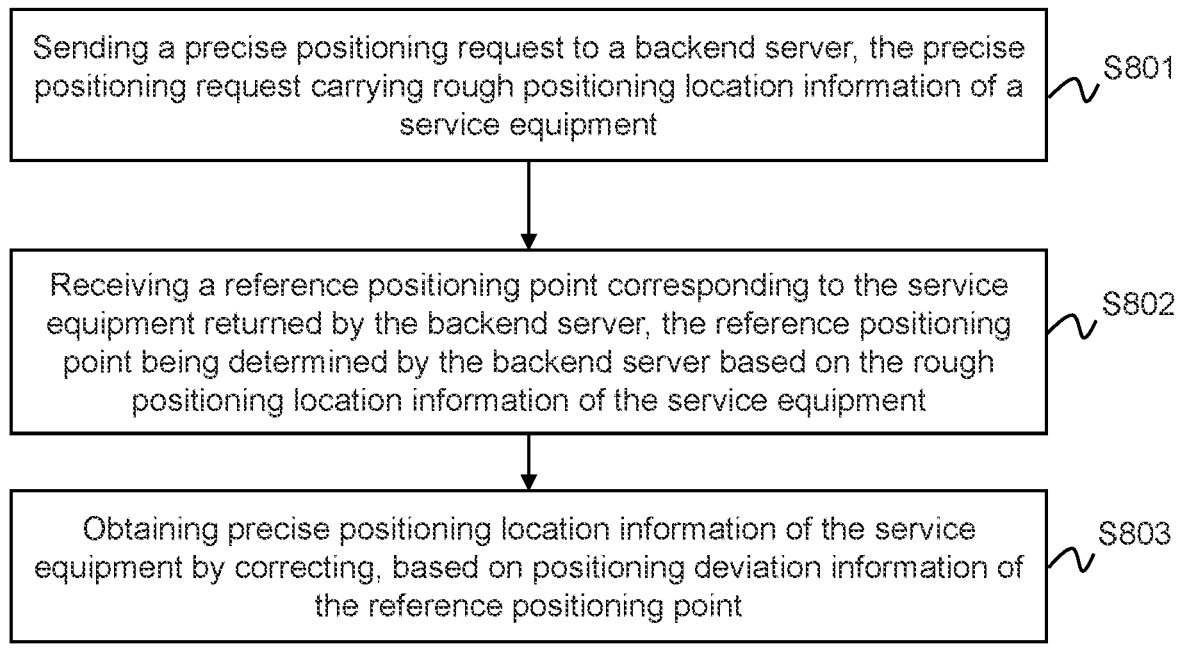
FIG. 8 is a flowchart illustrating an exemplary positioning process performed on a service equipment according to some embodiments of the present disclosure.

Some embodiments of the present disclosure also provide a positioning method. The positioning method may be applied to a service equipment. As shown in FIG. 8, the positioning method may include:

S801: a precise positioning request may be sent to a backend server. The precise positioning request may carry rough positioning location information of a service equipment.

S802: a reference positioning point corresponding to the service equipment determined by the backend server based on the rough positioning location information of the service equipment and returned by the backend server may be received.

S803: precise positioning location information of the service equipment may be obtained by correcting the rough positioning location information of the service equipment based on positioning deviation information of the reference positioning point.

The positioning deviation information of the reference positioning point may be calculated based on the precise positioning location information of the reference positioning point and the rough positioning location information of the reference positioning point.

The process for determining the reference positioning point may be similar to the aforementioned process, and will not be repeated here.

The deviation information of the reference positioning point may also be determined by the backend server of shared vehicles and then sent to the service equipment, or may be determined by the service equipment. that is, the backend server may send the reference positioning point and the precise positioning location information and rough positioning location information of the reference positioning point to the service equipment, and the service equipment may determine the positioning deviation information based on the precise positioning location information and rough positioning location information of the reference positioning point, which will not be specifically limited here.

The process of the service equipment correcting the rough positioning location information of the service equipment based on the positioning deviation information may be similar to the correction process described above, and will not be repeated here.

In some embodiments, if there are a plurality of reference positioning points, the obtaining the precise positioning location information of the service equipment by correcting the rough positioning location information of the service equipment based on the positioning deviation information of the reference positioning points may include:

A weighting coefficient may be determined based on a distance between the service equipment and each reference positioning point.

Comprehensive deviation information may be determined by weighting positioning deviation information of each reference positioning point based on the weighting coefficient.

Precise positioning location information of the service equipment may be obtained by correcting the rough positioning location information of the service equipment based on the comprehensive deviation information.

The determining the comprehensive deviation information may be implemented by the service equipment by performing the weighting after determining the weighting coefficient based on the distance between each reference positioning point and the service equipment. The specific process may be similar to that described above, and will not be repeated here.

Based on the same inventive concept, some embodiments of the present disclosure also provide a positioning device corresponding to the positioning method. Since the principle of the device in the embodiments of the present disclosure solving the problem is similar to that of the positioning method described above in the embodiments of the present disclosure, the implementation of the device may be found in the implementation of the method, and the description will not be repeated.

Figure 9:
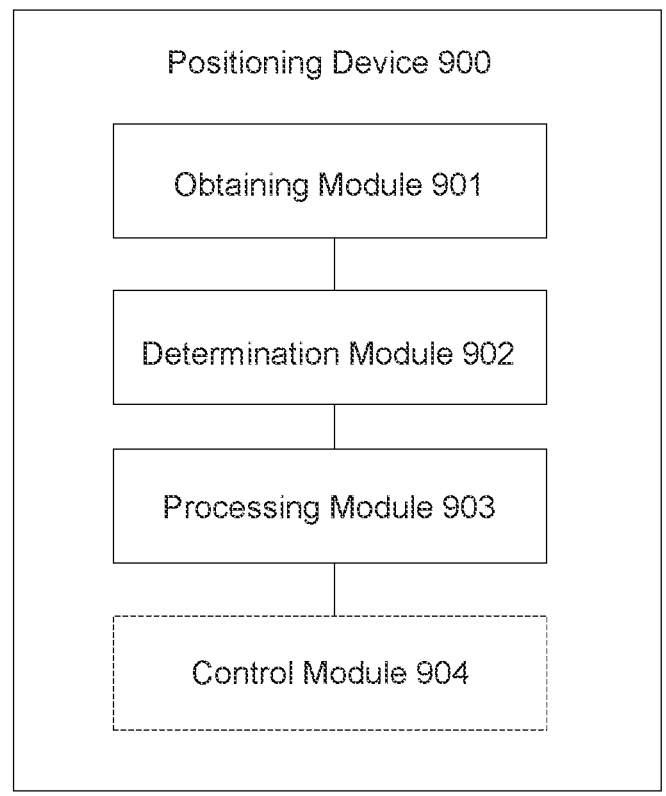
FIG. 9 is a block diagram illustrating an exemplary positioning device according to some embodiments of the present disclosure.

Some embodiments of the present disclosure also provide a positioning device 900. As shown in FIG. 9, the positioning device 900 may reside in a backend server and may include:

an obtaining module 901 configured to obtain a precise positioning request sent by a service equipment. The precise positioning request may carry rough positioning location information of the service equipment.

a determination module 902 configured to determine a reference positioning point corresponding to the service equipment based on the rough positioning location information of the service equipment.

a processing module 903 configured to obtain precise positioning location information of the service equipment by correcting the rough positioning location information of the service equipment based on positioning deviation information of the reference positioning point. The positioning deviation information of the reference positioning point may be calculated based on precise positioning location information of the reference positioning point and rough positioning location information of the reference positioning point.

In some embodiments, the determination module 902 may be further configured to:

calculate a distance between the service equipment and each positioning point based on the rough positioning location information of the service equipment;

select a positioning point with the shortest distance from the service equipment as a reference positioning point.

In some embodiments, the determination module 902 may be further configured to:

determine a positioning region where the service equipment is located based on the rough positioning location information of the service equipment and preset positioning region information;

determine a positioning point in the positioning region where the service equipment is located as a reference positioning point.

In some embodiments, edges of two adjacent positioning regions may be close to each other, or edges of two adjacent positioning regions may overlap with each other.

In some embodiments, if there are a plurality of reference positioning points, the processing module 903 may be further configured to:

determine a weighting coefficient based on the distance between the service equipment and each reference positioning point;

determine comprehensive deviation information by weighting positioning deviation information of each reference positioning point based on the weighting coefficient to determine comprehensive deviation information;

obtaining precise positioning location information of the service equipment by correcting the rough positioning location information of the service equipment based on the comprehensive deviation information.

In some embodiments, the precise positioning request may also carry an identification code of the service equipment. The service equipment may be a vehicle. The positioning device 900 may further include a control module 904 configured to, after the processing module 903 acquires the precise positioning location information of the service equipment:

When receiving information indicating that the vehicle has been locked sent by the service equipment, determine whether the vehicle is located in a legitimate parking region based on the precise positioning location information of the service equipment and pre-stored legitimate parking region information.

In response to determining that the vehicle is located in the legitimate parking region, control the service equipment to perform an unlocking operation, and send information indicating that the vehicle cannot be locked to a user terminal associated with the identification code.

In some embodiments, the service equipment may be a vehicle. The positioning device 900 may further include a control module 904 configured to, after the processing module acquires the precise positioning location information of the service equipment:

when receiving a locking request sent by a user terminal, determine whether a vehicle is located in a legitimate parking region based on the precise positioning location information of the service equipment and pre-stored legitimate parking region information;

in response to determining that vehicle is not located in the legitimate parking region, send information indicating that the vehicle cannot be locked to the user terminal.

Some embodiments of the present disclosure also provide a positioning device 1000. The positioning device 1000 may reside in a service equipment and may include:

a sending module 1001 configured to send a precise positioning request to a backend server. The precise positioning request may carry rough positioning location information of the service equipment;

a receiving module 1002 configured to receive a reference positioning point corresponding to the service equipment determined by the backend server based on the rough positioning location information of the service equipment and returned by the backend server;

a processing module 1003 configured to obtain precise positioning location information of the service equipment by correcting the rough positioning location information of the service equipment based on positioning deviation information of the reference positioning point. The positioning deviation information of the reference positioning point may be calculated based on precise positioning location information of the reference positioning point and rough positioning location information of the reference positioning point.

In some embodiments, if there are a plurality of reference positioning points, the processing module 1003 may be further configured to:

determine a weighting coefficient based on the distance between the service equipment and each reference positioning point;

determine comprehensive deviation information by weight positioning deviation information of each reference positioning point based on the weighting coefficient;

obtain precise positioning location information of the service equipment by correcting the rough positioning location information of the service equipment based on the comprehensive deviation information.

More description regarding the processing process of the modules in the device and the interaction between the modules may be found in relevant descriptions of the above method embodiments, which will not be described in detail here.

Figure 11:
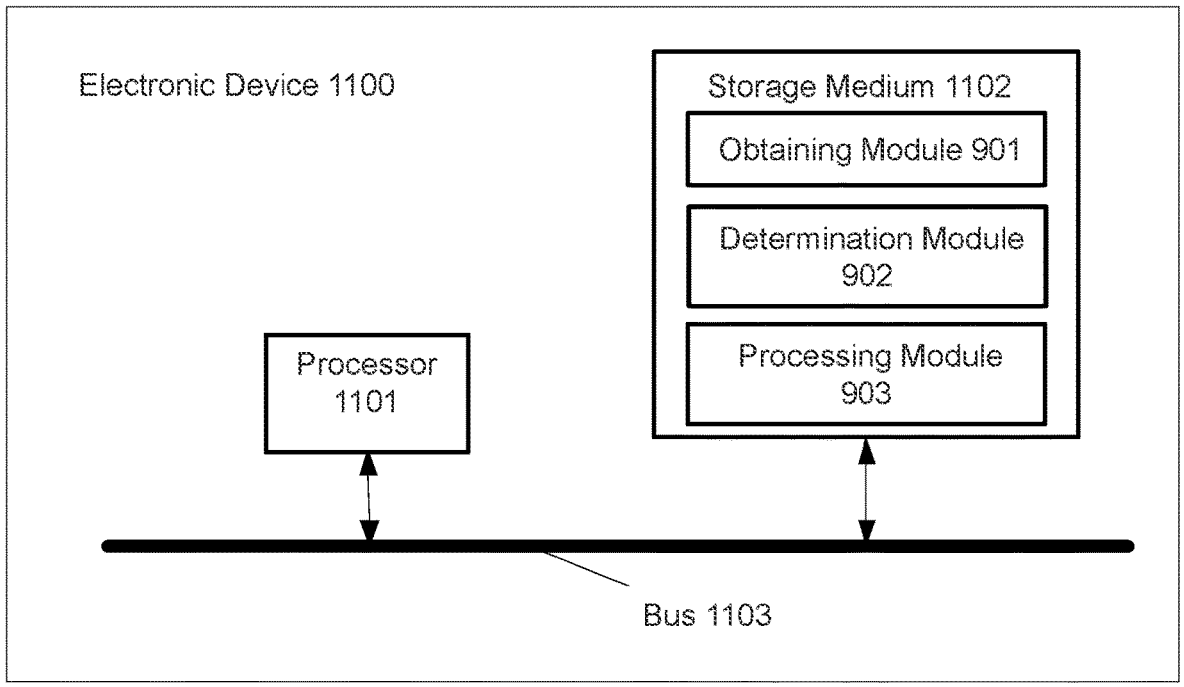
FIG. 11 is a block diagram illustrating an exemplary electronic device according to some embodiments of the present disclosure.

Some embodiments of the present disclosure also provide an electronic device. The electronic device may be a back-end server or a service equipment. When the electronic device is a backend server, as shown in FIG. 11, an electronic device 1100 provided by the embodiments of the present disclosure may include a processor 1101, a storage medium 1102, and a bus 1103. The storage medium 1102 may store machine-readable instructions executable by the processor 1101 (e.g., execution instructions corresponding to the obtaining module 901, the determination module 902, and the processing module 903 in the device in FIG. 9). When the electronic device 1100 operates, the processor 1101 may communicate with the storage medium 1102 through the bus 1103, and when the machine-readable instructions are executed by the processor 1101, the following processing may be performed:

A precise positioning request sent by a service equipment may be obtained. The precise positioning request may carry rough positioning location information of the service equipment;

A reference positioning point corresponding to the service equipment may be determined based on the rough positioning location information of the service equipment.

Precise positioning location information of the service equipment may be obtained by correcting the rough positioning location information of the service equipment based on positioning deviation information of the reference positioning point. The positioning deviation information of the reference positioning point may be calculated based on precise positioning location information of the reference positioning point and rough positioning location information of the reference positioning point.

In some embodiments, the instructions executed by the processor 1101 may further include:

A distance between the service equipment and each positioning point may be calculated based on the rough positioning location of the service equipment.

A positioning point with the shortest distance from the service equipment may be selected as a reference positioning point.

In some embodiments, the instructions executed by the processor 1101 may further include:

A positioning region where a service equipment is located may be determined based on rough positioning location information of the service equipment and preset positioning region information.

A positioning point in the positioning region where the service equipment is located may be determined as a reference positioning point.

Edges of two adjacent positioning regions may be close to each other, or edges of two adjacent positioning regions may overlap with each other.

If there are a plurality of reference positioning points, in some embodiments, the instructions executed by the processor 1101 may further include:

A weighting coefficient may be determined based on a distance between the service equipment and each reference positioning point.

Comprehensive deviation information may be determined by weighting positioning deviation information of each reference positioning point based on the weighting coefficient.

Precise positioning location information of the service equipment may be obtained by correcting the rough positioning location information of the service equipment according to the comprehensive deviation information.

The precise positioning request may also carry an identification code of the service equipment. The service equipment may be a vehicle. In some embodiments, the instructions executed by the processor 1101 after obtaining the precise positioning location information of the service equipment may further include:

When receiving information indicating that the vehicle has been locked sent by the service equipment, whether the vehicle is located in a legitimate parking region may be determined based on the precise positioning location information of the service equipment and pre-stored legitimate parking region information.

In response to determining that the vehicle is not located in the legitimate parking region, the service equipment may be controlled to perform an unlocking operation, and information indicating that the vehicle cannot be locked may be sent to a user terminal associated with the identification code.

The service equipment may be a vehicle. In some embodiments, the instructions executed by the processor 1101 after obtaining the precise positioning location information of the service equipment may further include:

When receiving a locking request sent by a user terminal, whether the vehicle is located in a legitimate parking region may be determined based on the precise positioning location information of the service equipment and pre-stored legitimate parking region information.

In response to determining that the vehicle is not located in the legitimate parking region, information indicating that the vehicle cannot be locked may be sent to the user terminal.

Figure 10:
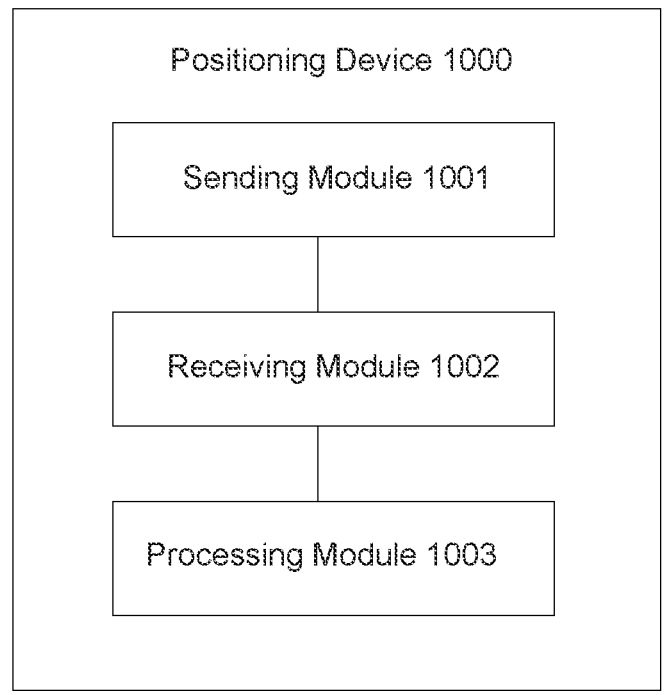
FIG. 10 is a block diagram illustrating another exemplary positioning device according to some embodiments of the present disclosure.
Figure 12:
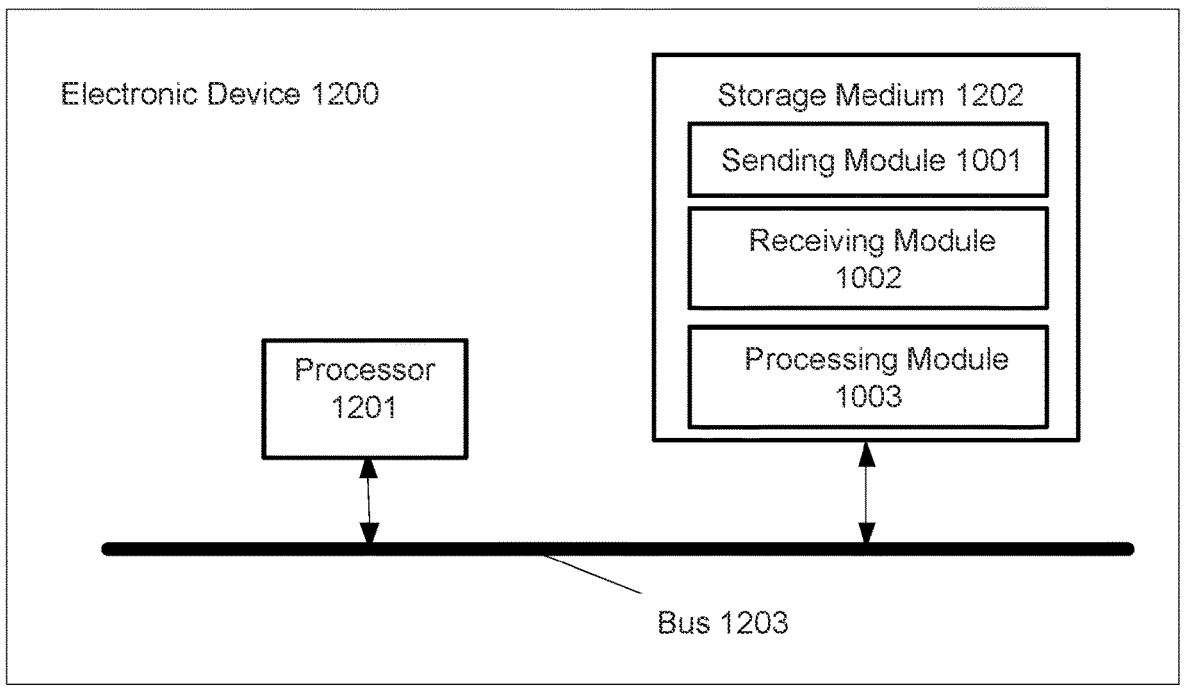
FIG. 12 is a block diagram illustrating another exemplary electronic device according to some embodiments of the present disclosure.

When the electronic device is a service equipment, as shown in FIG. 12, an electronic device 1200 provided by some embodiments of the present disclosure may include a processor 1201, a storage medium 1202, and a bus 1203. The storage medium 1202 may store machine-readable instructions executable by the processor 1201 (e.g., execution instructions, etc. corresponding to the sending module 1001, the receiving module 1002, and the processing module 1003 in the device in FIG. 10). When the electronic device 1200 operates, the processor 1201 may communicate with the storage medium 1202 through the bus 1103, and when the machine-readable instructions are executed by the processor 1201, the following process may be performed:

A precise positioning request may be sent to a backend server. The precise positioning request may carry rough positioning location information of a service equipment.

A reference positioning point corresponding to the service equipment determined by the backend server based on the rough positioning location information of the service equipment and returned by the backend server may be received.

Precise positioning location information of the service equipment may be obtained by correcting the rough positioning location information of the service equipment based on positioning deviation information of the reference positioning point. The positioning deviation information of the reference positioning point may be calculated based on precise positioning location information of the reference positioning point and rough positioning location information of the reference positioning point.

If there are a plurality of reference positioning points, in some embodiments, the instructions executed by the processor 1101 may include:

A weighting coefficient may be determined based on a distance between the service equipment and each reference positioning point.

Comprehensive deviation information may be determined by weighting positioning deviation information of each reference positioning point based on the weighting coefficient.

Precise positioning location information of the service equipment may be obtained by correcting the rough positioning location information of the service equipment based on the comprehensive deviation information.

Some embodiments of the present disclosure also provide a computer-readable storage medium including a computer program that, when executed by a processor, direct the processor to perform the operations of the above positioning method.

In some embodiments, the storage medium may be a general storage medium, such as a mobile disk or a hard disk. The computer program on the storage medium may be executed to perform the above positioning method to implement precise positioning of the service equipment.

Those skilled in the art may clearly understand that, for convenience and concise description, the specific operation processes of the system and device described above may refer to the corresponding processes in the embodiments of the method, and will not be repeated in the present disclosure. In the embodiments provided in the present disclosure, it should be understood that the disclosed system, device, and method may be implemented in other ways. The device embodiments described above are merely illustrative. For example, the division of the modules is only a logical function division, and there may be other division methods in actual implementation. As another example, a plurality of modules or components may be combined or be integrated into another system, or some features may be ignored or not executed. In addition, the displayed or discussed mutual coupling, direct coupling, or communication connection may be indirect coupling or communication connection through communication interfaces, devices, or modules, and may be in an electrical form, a mechanical form or other forms.

The modules described as separate components may or may not be physically separated, and the components displayed as modules may or may not be physical units, that is, the components displayed as modules may be located in one place, or may be distributed on a plurality of network units. Some or all of the units may be selected according to actual needs to achieve the objectives of the solutions of the embodiments.

In addition, the functional units in each embodiment of the present disclosure may be integrated into one processing unit, or each unit may exist alone physically, or two or more units may be integrated into one unit.

If the function is implemented in the form of a software functional unit and sold or used as an independent product, it may be stored on a non-volatile computer-readable storage medium executable by a processor. Based on this understanding, the technical solution of the present disclosure essentially or the part that contributes to the prior art or a part of the technical solution may be embodied in the form of a software product, and the computer software product is stored on a storage medium, and includes a number of instructions to cause a computer device (which may be a personal computer, a server, a network device, etc.) to execute all or part of the operations of the methods described in the various embodiments of the present disclosure. The aforementioned storage medium includes a U disk, a mobile hard disk, an ROM, an RAM, a magnetic disk, an optical disk, or other media that may store program codes.

The above are merely specific implementation methods of the present disclosure, the protection scope of the present disclosure is not limited to this. Any person skilled in the art may easily think of changes or substitutions within the technical scope disclosed in the present disclosure, and these changes or substitutions shall all fall within the scope of the present disclosure. Therefore, the protection scope of the present disclosure shall be subject to the protection scope of the claims.

We claim:

1. A positioning method applied to a backend server, comprising:
   obtaining a precise positioning request sent by a service equipment, the precise positioning request carrying rough positioning location information of the service equipment;
   determining, based on the rough positioning location information of the service equipment, a reference positioning point corresponding to the service equipment; and
   obtaining precise positioning location information of the service equipment by correcting, based on positioning deviation information of the reference positioning point, the rough positioning location information of the service equipment, the positioning deviation information of the reference positioning point being calculated based on precise positioning location information of the reference positioning point and rough positioning location information of the reference positioning point.

2. The positioning method according to claim 1, wherein the determining, based on the rough positioning location information of the service equipment, a reference positioning point corresponding to the service equipment comprises:
   calculating, based on the rough positioning location information of the service equipment, a distance between the service equipment and each positioning point; and
   selecting a positioning point with the shortest distance from the service equipment as the reference positioning point.

3. The positioning method according to claim 1, wherein the determining, based on the rough positioning location information of the service equipment, a reference positioning point corresponding to the service equipment comprises:

determining, based on the rough positioning location information of the service equipment and preset positioning region information, a positioning region where the service equipment is located; and determining a positioning point in the positioning region where the service equipment is located as the reference positioning point.

4. The positioning method according to claim 3, wherein edges of two adjacent positioning regions are close to each other; or edges of two adjacent positioning regions overlap with each other.

5. The positioning method according to claim 1, wherein if there are a plurality of reference positioning points, the obtaining precise positioning location information of the service equipment by correcting, based on positioning deviation information of the reference positioning point, the rough positioning location information of the service equipment comprises:

determining a weighting coefficient based on a distance between the service equipment and each reference positioning point;

determining comprehensive deviation information by weighting, based on the weighting coefficient, the positioning deviation information of each reference positioning point; and obtaining the precise positioning location information of the service equipment by correcting, based on the comprehensive deviation information, the rough positioning location information of the service equipment.

6. The positioning method according to claim 1, wherein the precise positioning request further carries an identification code of the service equipment, the service equipment is a vehicle, and after obtaining the precise positioning location information of the service equipment, the positioning method further comprises:

when receiving information indicating that the vehicle has been locked sent by the service equipment, determining, based on the precise positioning location information of the service equipment and pre-stored legitimate parking region information, whether the vehicle is located in a legitimate parking region; and in response to determining that the vehicle is not located in the legitimate parking region, controlling the service equipment to perform an unlocking operation, and sending information indicating that the vehicle cannot be locked to a user terminal associated with the identification code.

7. The positioning method according to claim 1, wherein the service equipment is a vehicle, and after obtaining the precise positioning location information of the service equipment, the positioning method further comprises:

when receiving a locking request sent by a user terminal, determining, based on the precise positioning location information of the service equipment and pre-stored legitimate parking region information, whether the vehicle is located in a legitimate parking region; and in response to determining that the vehicle is not located in the legitimate parking region, sending information indicating that the vehicle cannot be locked to the user terminal.

8. A positioning method applied to a service equipment, comprising:

sending a precise positioning request to a backend server, the precise positioning request carrying rough positioning location information of the service equipment;

receiving a reference positioning point corresponding to the service equipment returned by the backend server, the reference positioning point being determined by the backend server based on the rough positioning location information of the service equipment; and obtaining precise positioning location information of the service equipment by correcting, based on positioning deviation information of the reference positioning point, the rough positioning location information of the service equipment, the positioning deviation information of the reference positioning point being calculated based on precise positioning location information of the reference positioning point and rough positioning location information of the reference positioning point.

9. The positioning method according to claim 8, wherein if there are a plurality of reference positioning points, the obtaining precise positioning location information of the service equipment by correcting, based on positioning deviation information of the reference positioning point, the rough positioning location information of the service equipment comprises:

determining a weighting coefficient based on a distance between the service equipment and each reference positioning point;

determining comprehensive deviation information by weighting, based on the weighting coefficient, positioning deviation information of each reference positioning point; and obtaining the precise positioning location information of the service equipment by correcting, based on the comprehensive deviation information, the rough positioning location information of the service equipment.

10. The positioning method according to claim 8, wherein the reference positioning point corresponding to the service equipment is determined according to a process including:

calculating, based on the rough positioning location information of the service equipment, a distance between the service equipment and each positioning point; and selecting a positioning point with the shortest distance from the service equipment as the reference positioning point.

11. The positioning method according to claim 8, wherein the reference positioning point corresponding to the service equipment is determined according to a process including:

determining, based on the rough positioning location information of the service equipment and preset positioning region information, a positioning region where the service equipment is located; and determining a positioning point in the positioning region where the service equipment is located as the reference positioning point.

12. An electronic device, comprising: a processor, a storage medium, and a bus, wherein the storage medium stores machine-readable instructions executable by the processor, and when the electronic device operates, the processor communicates with the storage medium through the bus, and the processor executes the machine-readable instructions to:

determine, based on the rough positioning location information of the service equipment, a reference positioning point corresponding to the service equipment; and obtain precise positioning location information of the service equipment by correcting, based on positioning deviation information of the reference positioning point, the rough positioning location information of the service equipment, the positioning deviation information of the reference positioning point being calculated based on precise positioning location information of the reference positioning point and rough positioning location information of the reference positioning point.

13. The electronic device according to claim 12, wherein to determine, based on the rough positioning location information of the service equipment, a reference positioning point corresponding to the service equipment, the processor executes the machine-readable instructions to:
calculate, based on the rough positioning location information of the service equipment, a distance between the service equipment and each positioning point; and
select a positioning point with the shortest distance from the service equipment as the reference positioning point.

14. The electronic device according to claim 12, wherein to determine, based on the rough positioning location information of the service equipment, a reference positioning point corresponding to the service equipment, the processor executes the machine-readable instructions to:
determine, based on the rough positioning location information of the service equipment and preset positioning region information, a positioning region where the service equipment is located; and
determine a positioning point in the positioning region where the service equipment is located as the reference positioning point.

15. The electronic device according to claim 14, wherein
edges of two adjacent positioning regions are close to each other; or
edges of two adjacent positioning regions overlap with each other.

16. The electronic device according to claim 12, wherein if there are a plurality of reference positioning points, to obtain precise positioning location information of the service equipment by correcting, based on positioning deviation information of the reference positioning point, the rough positioning location information of the service equipment, the processor executes the machine-readable instructions to:
determine a weighting coefficient based on a distance between the service equipment and each reference positioning point;
determine comprehensive deviation information by weighting, based on the weighting coefficient, the positioning deviation information of each reference positioning point; and
obtain the precise positioning location information of the service equipment by correcting, based on the comprehensive deviation information, the rough positioning location information of the service equipment.

17. The electronic device according to claim 12, wherein the precise positioning request further carries an identification code of the service equipment, the service equipment is a vehicle, and after obtaining the precise positioning location information of the service equipment, the processor executes the machine-readable instructions further to:
when receiving information indicating that the vehicle has been locked sent by the service equipment, determine, based on the precise positioning location information of the service equipment and pre-stored legitimate parking region information, whether the vehicle is located in a legitimate parking region; and
in response to determining that the vehicle is not located in the legitimate parking region, control the service equipment to perform an unlocking operation, and sending information indicating that the vehicle cannot be locked to a user terminal associated with the identification code.

18. The electronic device according to claim 12, wherein the service equipment is a vehicle, and after obtaining the precise positioning location information of the service equipment, the processor executes the machine-readable instructions further to:
when receiving a locking request sent by a user terminal, determine, based on the precise positioning location information of the service equipment and pre-stored legitimate parking region information, whether the vehicle is located in a legitimate parking region; and
in response to determining that the vehicle is not located in the legitimate parking region, send information indicating that the vehicle cannot be locked to the user terminal.

19. The electronic device according to claim 12, wherein the processor executes the machine-readable instructions further to:
send a precise positioning request to a backend server, the precise positioning request carrying rough positioning location information of the service equipment;
receive a reference positioning point corresponding to the service equipment returned by the backend server, the reference positioning point being determined by the backend server based on the rough positioning location information of the service equipment; and
obtain precise positioning location information of the service equipment by correcting, based on positioning deviation information of the reference positioning point, the rough positioning location information of the service equipment, the positioning deviation information of the reference positioning point being calculated based on precise positioning location information of the reference positioning point and rough positioning location information of the reference positioning point.

20. The electronic device according to claim 12, wherein if there are a plurality of reference positioning points, to obtain precise positioning location information of the service equipment by correcting, based on positioning deviation information of the reference positioning point, the rough positioning location information of the service equipment, the processor executes the machine-readable instructions to:
determine a weighting coefficient based on a distance between the service equipment and each reference positioning point;
determine comprehensive deviation information by weighting, based on the weighting coefficient, positioning deviation information of each reference positioning point; and
obtain the precise positioning location information of the service equipment by correcting, based on the comprehensive deviation information, the rough positioning location information of the service equipment.

* * * * *